(12) United States Patent
Kuromizu

(10) Patent No.: US 8,182,105 B2
(45) Date of Patent: May 22, 2012

(54) OPTICAL MEMBER, LIGHT SOURCE DEVICE, AND DISPLAY DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 408 days.

(21) Appl. No.: 12/447,730

(22) PCT Filed: Jun. 25, 2007

(86) PCT No.: PCT/JP2007/062690
§ 371 (c)(1),
(2), (4) Date: Apr. 29, 2009

(87) PCT Pub. No.: WO2008/053614
PCT Pub. Date: May 8, 2008

(65) Prior Publication Data
US 2010/0053994 A1 Mar. 4, 2010

(30) Foreign Application Priority Data
Oct. 31, 2006 (JP) .................................. 2006-295671

(51) Int. Cl.
*G09F 13/04* (2006.01)
(52) U.S. Cl. ....... 362/97.2; 259/599; 362/223; 362/225; 362/311.02; 362/355
(58) Field of Classification Search .................. 362/97.1, 362/97.2, 223, 311.01, 355, 341, 606, 613, 362/618, 225; 359/599
See application file for complete search history.

(56) References Cited

U.S. PATENT DOCUMENTS
7,455,425 B2 * 11/2008 Inoue et al. .................. 362/97.1
2006/0139952 A1 6/2006 Inoue et al.

FOREIGN PATENT DOCUMENTS
| JP | 04-061701 A | 2/1992 |
| JP | 06-075216 A | 3/1994 |
| JP | 2000-149633 A | 5/2000 |
| JP | 2002-082626 A | 3/2002 |
| JP | 2005-347062 A | 12/2005 |
| WO | 2004/038283 A1 | 5/2004 |

OTHER PUBLICATIONS

Official Communication issued in International Patent Application No. PCT/JP2007/062690, mailed on Jul. 31, 2007.

* cited by examiner

*Primary Examiner* — Stephen F Husar
(74) *Attorney, Agent, or Firm* — Keating & Bennett, LLP

(57) ABSTRACT

An optical member, a light source device, and a display device, which can prevent or reduce luminance irregularity on the screen of a display panel, include a sheet or plate shaped optical member located between the display panel which displays an image and a plurality of light sources including a region provided in an area corresponding to an area in which the arrangement intervals between the light sources are wider (an end portion of the screen of the display panel) and has light reflectance higher than light reflectance in a region provided in an area in which the arrangement intervals between the light sources are narrower (a center portion of the screen of the display panel).

16 Claims, 15 Drawing Sheets

OPTICAL MEMBER, LIGHT SOURCE DEVICE, AND DISPLAY DEVICE

BACKGROUND OF THE INVENTION

1. Field of the Invention

The present invention relates to an optical member, a light source device, and a display device, and more particularly, to an optical member included in a liquid crystal display device or a light source device for a liquid crystal display device which adjusts characteristics of light emitted by a light source, a light source device including the optical member, and a display device.

2. Description of the Related Art

A display device including a non-self-emissive display panel such as a transparent or translucent liquid crystal display panel is generally configured to include light sources on the back side of the display panel or to include a light source device including light sources (also referred to as "a back light device" and "a back light unit", for example). By illuminating the back side of the display panel with light emitted by the light sources and transmitting the light to the front side, such a display unit can make images visible on the front side of the display panel.

FIG. 15 is an exploded perspective view schematically showing the structure of relevant components of a conventional liquid crystal display device including light sources. A liquid crystal display device 9 shown in FIG. 15 includes a plurality of light sources 91, a liquid crystal display panel 93 (e.g., a transparent liquid crystal display panel), optical members 92 provided therebetween (also referred to as "optical sheets"), and other given members. The characteristics of light emitted by the light sources 91 are adjusted by the optical members 92, and the light illuminates the back side of the liquid crystal display panel 93.

In order to display images with high quality using the liquid crystal display device 9 having the above configuration, the distribution on the surface of the liquid crystal display 93 of the strength of the light illuminating the back side of the liquid crystal display panel 93 needs to be uniform. Thus, the liquid crystal display device 9 is generally configured such that the plurality of light sources 91 are arranged at substantially even intervals, and optical members (e.g., a diffusion plate and a diffusion sheet) capable of diffusing light are provided between the light sources 91 and the liquid crystal display panel 93 as shown in FIG. 15.

With the upsizing of liquid crystal display panels, the total amount of the light illuminating the back side of the liquid crystal display panel having the above configuration needs to be increased according to the screen size. Generally, the amount of light is increased by increasing the number of light sources included in a light source device or a display device.

However, increasing the number of light sources included in the light source device or the display device increases the number of components of the light source device or the display device, which results in an increased cost of components. If fluorescent tubes are used as light sources, the number of the fluorescent tubes needs to be increased, and the number of components such as inverters for driving the florescent tubes also needs to be increased. In addition, the increased number of light sources means an increased total amount of electricity for driving the light sources, which results in an increased power consumption of the light source device or the display device. This runs counter to the trend of power saving.

To solve the above problems, a configuration may be used in which the intervals between adjacent light sources (i.e., arrangement intervals between light sources) are made narrower in the area corresponding to the center portion of the screen of the liquid crystal display panel and are made wider in the areas corresponding to the end portions of the screen (see Japanese Patent Application Unexamined Publication No. Hei06-75216, Japanese Patent Application Unexamined Publication No. 2002-82626, and Japanese Patent Application Unexamined Publication No. 2005-347062). This configuration makes it possible to reduce the number of the light sources in the areas corresponding to the end portions of the screen compared to the configuration of arranging the light sources at even intervals. Accordingly, it is possible to reduce the number of components and to prevent an increase in or reduce power consumption of the light source device or the display device.

However, in the above configuration in which the arrangement intervals between the light sources are made wider in the areas corresponding to the end portions of the screen, the following problem may occur. Making the arrangement intervals between the light sources wider increases the difference between the luminance at positions on the screen of the liquid crystal display panel behind which the light sources are located and vicinities thereof and the luminance at positions behind which the light sources are not located (i.e., middle positions between the light sources). Consequently, although the screen luminance is uniform in the center portion of the liquid crystal display panel in which the arrangement intervals between the light sources are narrower, luminance irregularity may occur in the areas corresponding to the end portions in which the arrangement intervals between light sources are wider.

SUMMARY OF THE INVENTION

Hence, preferred embodiments of the present invention provide an optical member, a light source device, and a display device which prevent or reduce luminance irregularity on the screen when arrangement intervals between light sources are made wider in areas corresponding to the end portions of the screen.

In order to overcome the problems described above, an optical member to be placed between a display panel which displays an image on a screen and a light source which illuminates the display panel includes a region which is provided in an area corresponding to an end portion of the screen of the display panel and has higher light reflectance than light reflectance in a region which is provided in an area corresponding to a center portion of the screen of the display panel.

The region having higher light reflectance may increase in area from a side corresponding to the center side of the screen of the display panel toward a side corresponding to an end portion side of the screen of the display panel. It is also preferable that the light reflectance increases stepwise or gradually.

The optical member may include a region having higher light reflectance which is provided in an area corresponding to a position of the light source located in the end portion of the screen of the display panel.

The above configurations may be combined.

In another preferred embodiment of the present invention, a light source device for illuminating a display panel which displays an image on a screen includes a plurality of linear light sources, intervals between the adjacent light sources in an area corresponding to an end portion of the screen of the display panel being wider than intervals between the adjacent light sources in an area corresponding to a center portion of the display panel screen, and an optical member which is placed on the front side of the plurality of light sources and includes a region which is provided in an area corresponding to the area in which the intervals between the adjacent light sources are wider and has higher light reflectance than light reflectance of a region which is provided in other area. The region having higher light reflectance of the optical member can be configured in the same manner as the configuration described above.

Preferred embodiments of the present invention prevent or reduce significant variance in luminance at the border between an area in which the arrangement intervals between light sources are narrower and an area in which the arrangement intervals between light sources are wider. Accordingly, in the area corresponding to the center portion of the screen of the display panel, the luminance is made substantially uniform, and the luminance gently and gradually decreases from the center portion toward the ends. It is thus possible to reduce the number of the light sources and the number of components relating to the light sources while maintaining a sufficient luminance on the screen and preventing or reducing luminance irregularity.

Other features, elements, arrangements, steps, characteristics and advantages of the present invention will become more apparent from the following detailed description of preferred embodiments of the present invention with reference to the attached drawings.

DETAILED DESCRIPTION OF THE PREFERRED EMBODIMENTS

A detailed description of preferred embodiments of the present invention will now be given with reference to the accompanying drawings.

Figure 1:
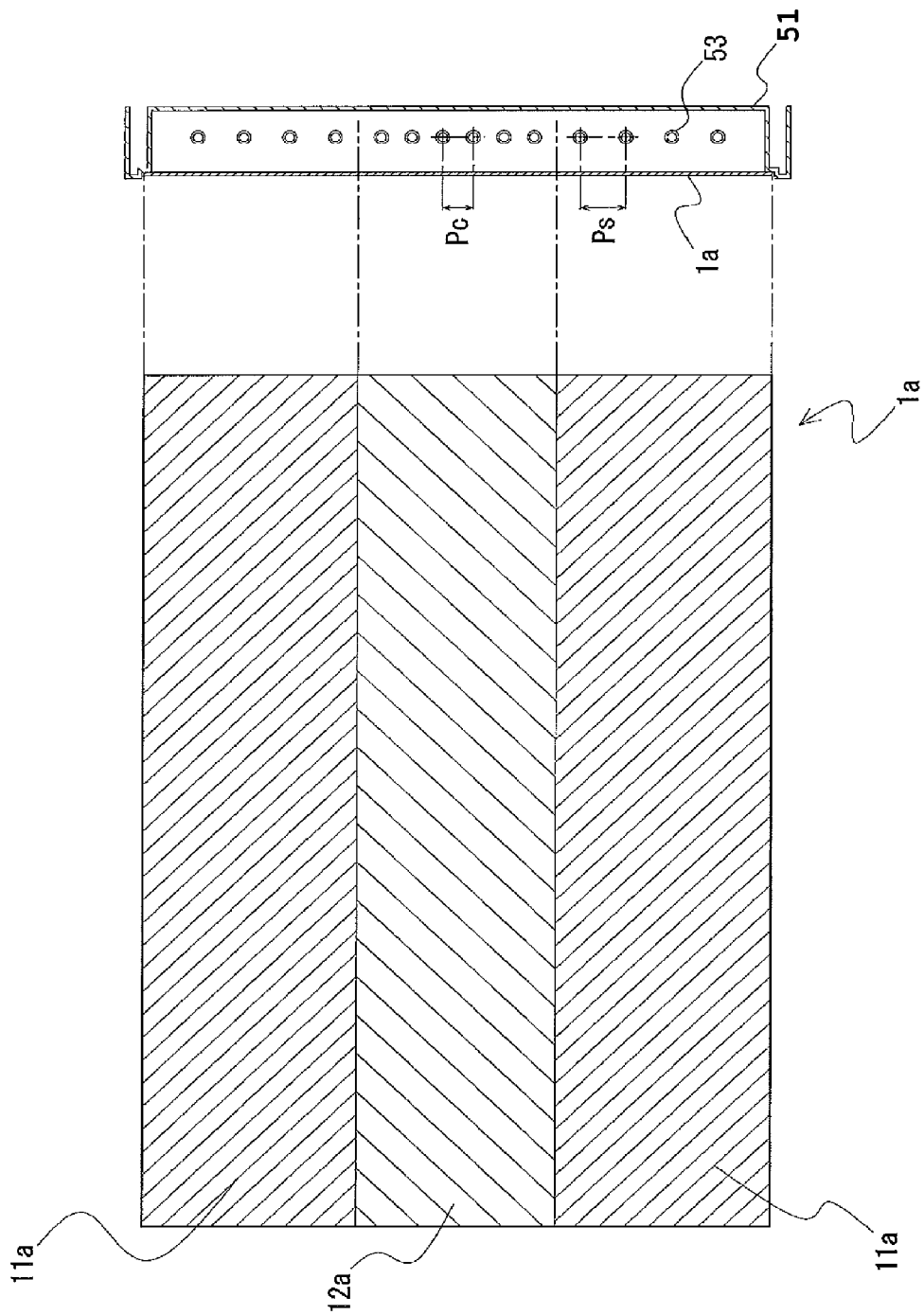
FIG. 1 shows a schematic plane view showing the configuration of an optical member 1a according to a first preferred embodiment of the present invention and a schematic sectional view showing the optical member 1a, a chassis 51, and light sources 53 of a light source device 5 to which the optical member 1a is applied.

FIG. 1 shows a schematic plane view showing the configuration of an optical member 1a according to a first preferred embodiment of the present invention and a schematic sectional view showing the optical member 1a, a chassis 51 (see FIG. 12), and light sources 53 of a light source device 5 to which the optical member 1a is applied. FIG. 1 shows the configuration of the optical member 1a according to the first preferred embodiment of the present invention and the relationship between the optical member 1a and the light sources 53 included in the light source device 5.

As shown in FIG. 1, the light source device 5 to which the optical member 1a according to the first preferred embodiment is applied includes the chassis 51 and the plurality of linear light sources 53. Fluorescent tubes such as a linear cold cathode tube are preferably used as the light sources 53. The light sources 53 are arranged on one side of the chassis 51 to be substantially parallel to one another as shown in FIG. 1. Intervals between the adjacent light sources 53, i.e. the arrangement intervals between the light sources 53, are set narrower in a center area (an area corresponding to the center portion of the display panel screen), and are wider in end areas (areas corresponding to the end portions of the display panel screen). In other words, an interval Ps between the light sources 53 located in the end areas is set wider than an interval Pc between the light sources 53 located in the center area.

The optical member 1*a* according to the first preferred embodiment is placed on the front side of the light sources 53. The optical member 1*a* according to the first preferred embodiment is a sheet-shaped or plate-shaped member, in which a predetermined area on the surface of a sheet-shaped or plate-shaped base member which is transparent or almost transparent is treated to reflect light diffusely.

As the sheet-shaped or plate-shaped base member, a synthetic resin material which is transparent or almost transparent can be used such as PMMA (polymethyl methacrylate), PE (polyethylene), PET (polyethylene terephthalate), PP (polypropylene), PC (polycarbonate), PS (polystyrene), and MS resin (methacrylate styrene copolymer).

In order to treat the surface to reflect light diffusely, minute beads are distributed on the surface of the base member, for example. As the minute beads, beads preferably made of silica, cross-linked polymethylmethacrylate, cross-linked polystyrene, calcium carbonate, acrylic resin, or an organo-mineral complex material (e.g., silica-acrylic complex material) can be used. The average particle size of the beads is preferably in a range of 50 nm to 100 μm.

The material of the beads is not limited to the above materials. Any material can be used whose refractive index is within a range of about 1.4 to about 1.7, for example, and which has low tendency to adhere to one another, blocking resistance (blocking is a phenomenon in which a portion of bead coat comes to be adhered or bonded to the surface of the base member if pressure is applied between the surface of the bead coat and the surface of the base member), solvent resistance, heat resistance, and light resistance. The beads preferably have the shape of a perfect sphere.

The above configuration makes the light illuminating the surface of the optical member 1*a* according to the first preferred embodiment reflected diffusely by the beads distributed on the base member surface.

The reflectance (in this specification, "reflectance" refers to the ratio of reflection light intensity to incident light intensity when light is reflected by the surface of the substance) in end regions (regions corresponding to the end portions of the screen of the display panel) is configured to be higher than the reflectance in a center region (a region corresponding to the center portion of the screen of the display panel). In this specification, the regions having higher reflectance are referred to as "high-reflection regions", while the region having lower reflectance is referred to as "a low-reflection region". In addition, the "end regions" refer to regions located in front of the areas in which the arrangement intervals between the light sources are wider when the optical member according to the first preferred embodiment is placed in front of the light sources of the light source device. Further, the "center region" refers to a region located in front of the area in which the arrangement intervals between the light sources are narrower.

To make high-reflection regions 1*a* and a low-reflection region 12*a* have different reflectances, the numbers per unit area of beads distributed on the surface of the base member may be made different. When the number per unit area of beads is increased, the amount of light reflected by the beads is increased, resulting in an increased reflectance. Accordingly, by making the number per unit area of beads distributed on the high-reflection regions 11*a* larger than that on the low-reflection region 12*a*, the reflectance of the high-reflection regions 11*a* is made higher than that of the low-reflection region 12*a*. Alternatively, it may be configured such that beads are distributed on the high-reflection regions 11*a* and not distributed on the low-reflection region 12*a*.

To distribute beads on the base member surface, a solvent including beads is spread or dropped onto the base member surface and then volatilized, for example.

To make the numbers per unit area of distributed beads different between the high-reflection regions 11*a* and the low-reflection region 12*a*, the following method is preferably used. A solvent including beads is first spread or dropped onto the entire surface of the base member, and then the solvent including beads is additionally spread or dropped onto areas which become the high-reflection regions 11*a*. With this method, the high-reflection regions 11*a* are provided with additional beads, which results in a greater number per unit area of distributed beads and an increased reflectance. Alternatively, the amount of beads included in the solvent spread or dropped onto the low-reflection region 12*a* may be made different from the amount of beads included in the solvent spread or dropped onto the high-reflection regions 11*a*.

Figure 2A:
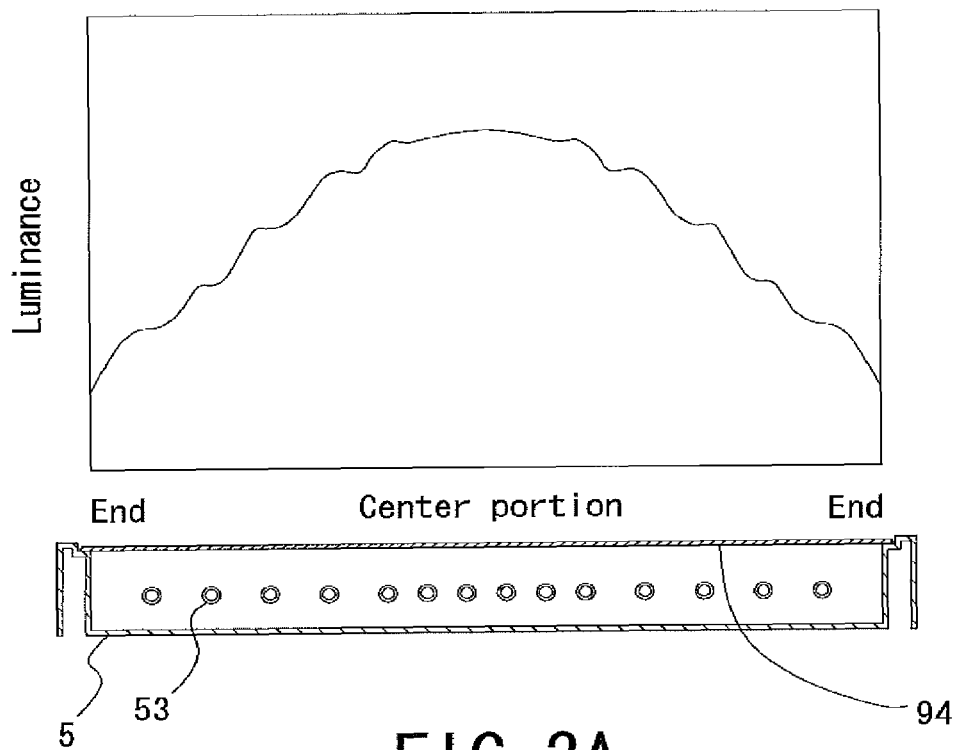
FIG. 2A is a graph schematically showing luminance distribution of light emitted by a conventional light source device 9.
Figure 2B:
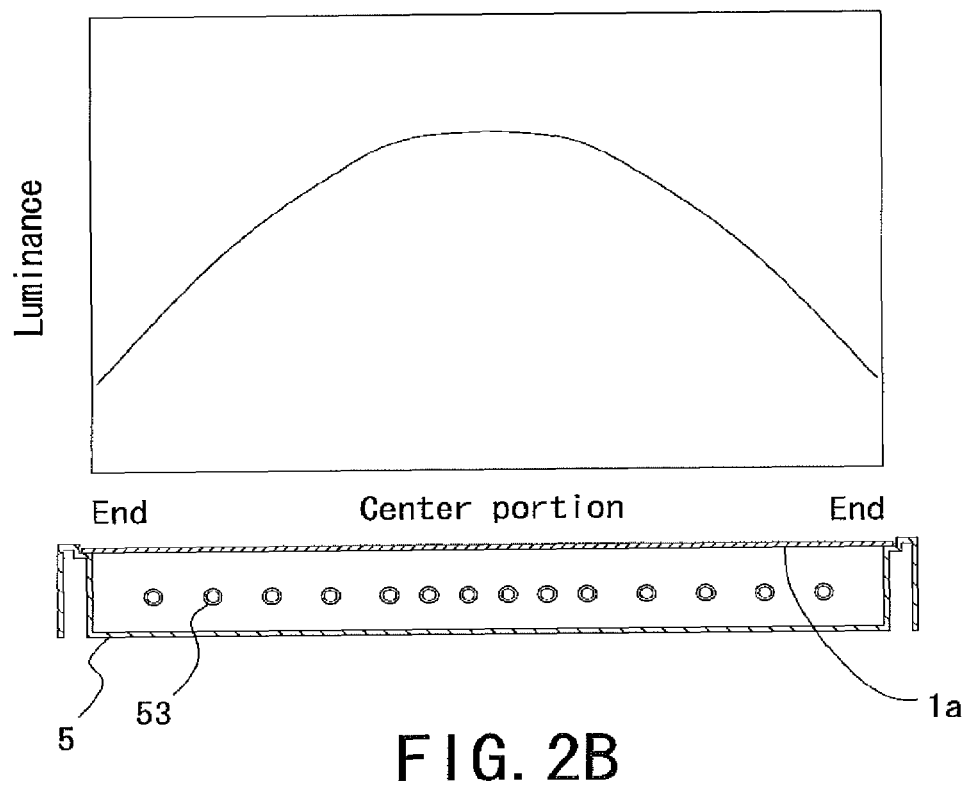
FIG. 2B is a graph schematically showing luminance distribution of light emitted by the light source device 5 including the optical member 1a according to the first preferred embodiment of the present invention.

FIG. 2A is a graph schematically showing luminance distribution of light emitted by a light source device including an optical member 94 whose light reflectance is uniform over the entire surface (i.e. a conventional light source device), and FIG. 2B is a graph schematically showing luminance distribution of light emitted by the light source device 5 including the optical member 1*a* according to the first preferred embodiment of the present invention. FIGS. 2A and 2B show that the luminance is higher in the area in which the arrangement intervals between the light sources 53 are narrower, while the luminance is lower in the areas in which the arrangement intervals between the light sources 53 are wider. In other words, the luminance is highest at the center of the screen and is lowest at the ends of the screen.

As shown in FIG. 2A, with the light source device including the optical member 94 whose light reflectance is uniform over the entire surface, the luminance significantly varies at the border between the area in which the arrangement intervals between the light sources 91 are narrower and the areas in which the arrangement intervals between the light sources 91 are wider. In the area in which the arrangement intervals between the light sources 91 are wider, there is a significant difference between the luminance at positions immediately in front of the light sources 91 and vicinities thereof and the luminance at positions distant from the light sources 91 (middle positions between the adjacent light sources 91). Consequently, the luminance varies in a step-like pattern.

Meanwhile, with the light source device 5 including the optical member 1*a* according to the first preferred embodiment, significant variance in luminance is prevented or reduced, and thus the luminance gently or gradually decreases toward the end portions. Because the arrangement intervals between the light sources 53 in the center portion are narrower, luminance irregularity does not easily occur even though the low-reflection region 12*a* of the optical member 1*a* according to the first preferred embodiment is located immediately in front of the center portion. Meanwhile, the high-reflection regions 11*a* are provided immediately in front of the end portions in which the arrangement intervals between the light sources 53 are wider, and thus the ratio of light reflected diffusely to light emitted by the light sources 53 is high, thereby preventing or reducing luminance irregularity.

Accordingly, the luminance is substantially uniform in the center area in which the arrangement intervals between the light sources 53 are narrower, and the luminance gently decreases from the center portion toward the both ends in the end areas in which the arrangement intervals between the light sources 53 are wider, such that significant variance in luminance is prevented or reduced. In general, the focus of a viewer is on the center portion, and thus even if the luminance in the end portions of the screen is slightly lower than the luminance in the center portion, the viewer does not feel that the screen view is deteriorated. Consequently, by using the optical member 1a according to the first preferred embodiment, the screen luminance is maintained to be sufficient, luminance irregularity is prevented or reduced, and the number of light sources can be reduced.

The present invention is not limited to the above first preferred embodiment. Various modified preferred embodiments are described below. The following modified preferred embodiments differ from the optical member 1a according to the first preferred embodiment mainly in configurations of high-reflection regions (especially, arrangements and regions). Thus, different configurations are mainly described and descriptions of configurations common to the first preferred embodiment are omitted.

Figure 3:
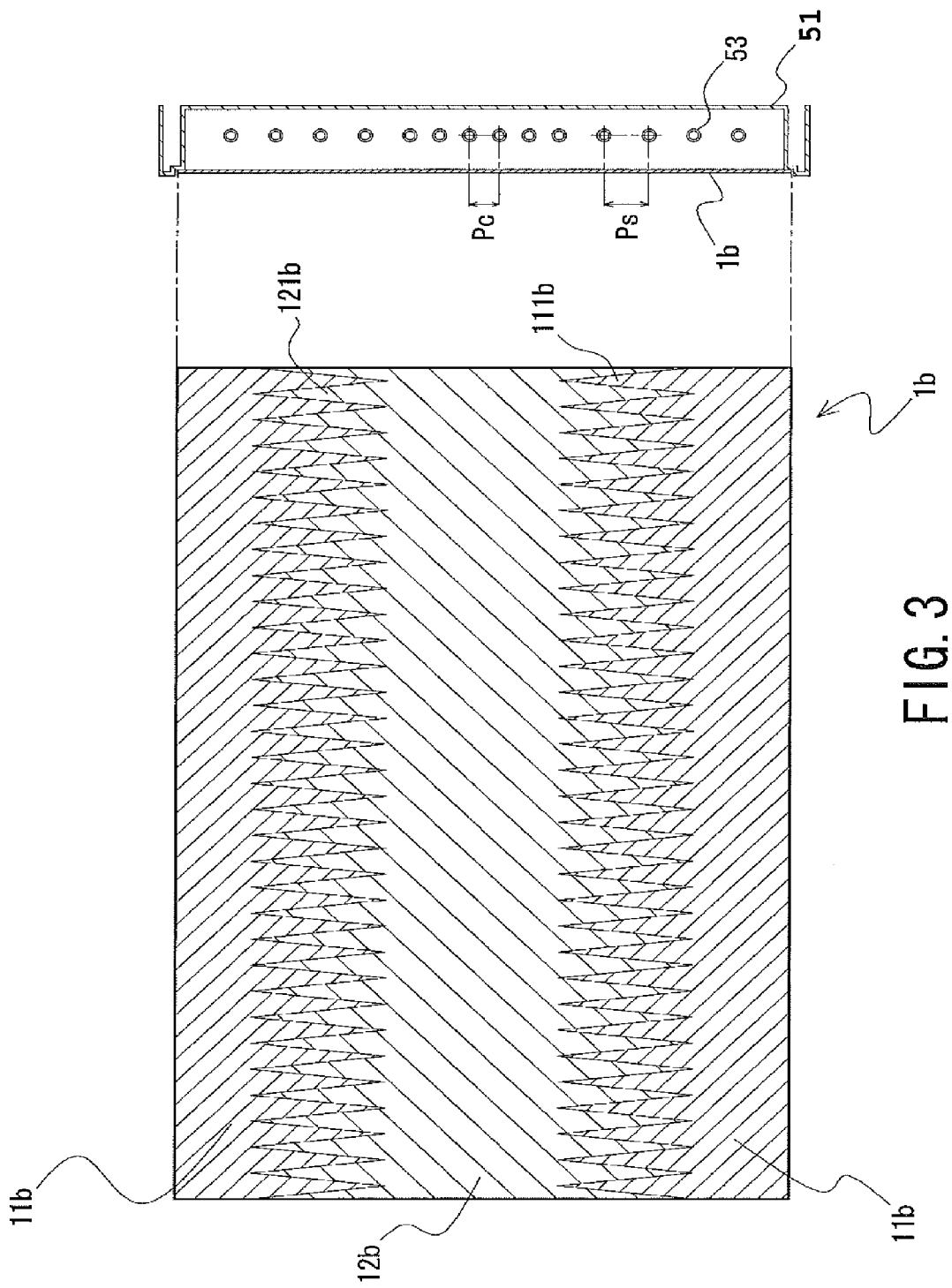
FIG. 3 shows a schematic plane view showing the configuration of an optical member 1b according to a second preferred embodiment of the present invention and a schematic sectional view showing the optical member 1b, the chassis 51, and the light sources 53 of the light source device 5 to which the optical member 1b is applied.

FIG. 3 shows a schematic plane view showing the configuration of an optical member 1b according to a second preferred embodiment of the present invention and a schematic sectional view showing the optical member 1b, the light sources 53, and the chassis 51 of the light source device 5 to which the optical member 1b is applied. FIG. 3 shows the configuration of the optical member 1b according to the second preferred embodiment of the present invention and the relationship between the optical member 1b and the light sources 53 included in the light source device 5.

As shown in FIG. 3, the optical member 1b according to the second preferred embodiment is provided with high-reflection regions 11b in the areas corresponding to the areas in which the arrangement intervals between the light sources 53 are wider. In the area corresponding to the area in which the arrangement intervals between the light sources 53 are narrower, a low-reflection region 12b is provided. The borders between the low-reflection region 12b and the high-reflection regions 11b have a sawtooth shape. In other words, at the borders between the low-reflection region 12b and the high-reflection regions 11b, a plurality of tapered branch portions 111b and 121b enter counterpart regions 12b and 11b respectively. Consequently, the optical member 1b according to the second preferred embodiment is configured such that the area of the high-reflection regions 11b gradually increases from the center portion toward the end portions at the borders between the low-reflection region 12b and the high-reflection regions 11b, and accordingly the reflectance gradually increases.

In the above configuration, the low-reflection region 12b is provided in front of the area in which the arrangement intervals between the light sources 53 are narrower, and the high-reflection regions 11b are provided in front of the areas in which the arrangement intervals between the light sources 53 are wider. Accordingly, the same advantages and beneficial effects are obtainable as those of the optical member 1a according to the first preferred embodiment. Additionally, because the reflectance gradually varies at the borders between the low-reflection region 12b and the high-reflection regions 11b, variance in luminance at the borders can be further prevented or reduced.

The high-reflection regions 11b and the low-reflection region 12b can be formed by the same method as the optical member 1a according to the first preferred embodiment, and thus the description thereof is omitted.

Figure 4:
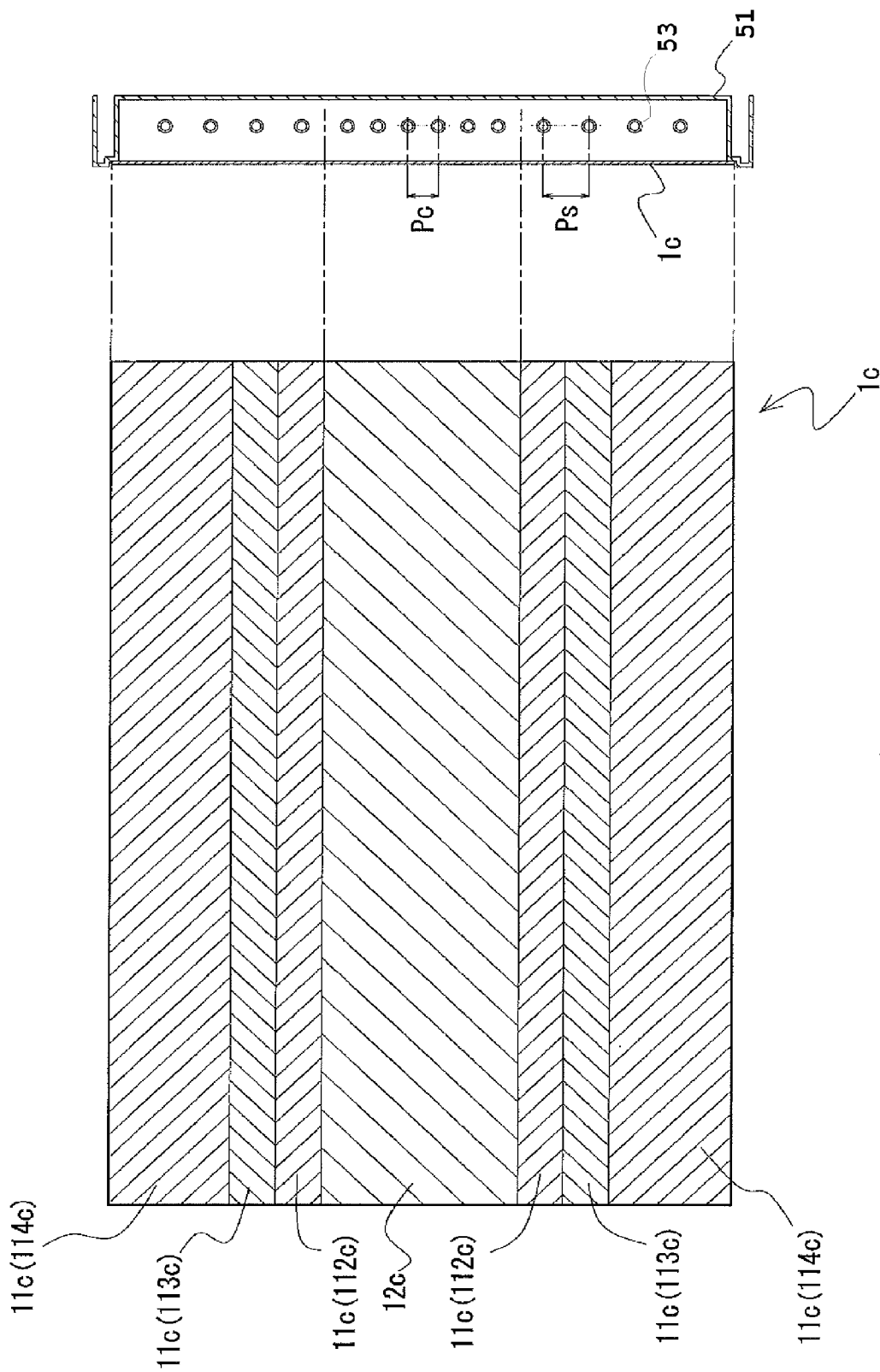
FIG. 4 shows a schematic plane view showing the configuration of an optical member 1c according to a third preferred embodiment of the present invention and a schematic sectional view showing the optical member 1c, the chassis 51, and the light sources 53 of the light source device 5 to which the optical member 1c is applied.

FIG. 4 shows a schematic plane view showing the configuration of an optical member 1c according to a third preferred embodiment of the present invention and a schematic sectional view showing the optical member 1c, the light sources 53, and the chassis 51 of the light source device 5 to which the optical member 1c is applied. FIG. 4 shows the configuration of the optical member 1c according to the third preferred embodiment of the present invention and the relationship between the optical member 1c and the light sources 53 included in the light source device 5.

As shown in FIG. 4, the optical member 1c according to the third preferred embodiment is provided with high-reflection regions 11c in the areas corresponding to the areas in which the arrangement intervals between the light sources 53 are wider. The high-reflection regions 11c include a plurality of subregions having different reflectances. These subregions are arranged such that the reflectance increases from the center portion toward the ends of the optical member 1c of the third preferred embodiment. To be more specific, in the configuration shown in FIG. 4, the low-reflection region 12c, subregions 112c adjacent to the low-reflection region 12c, subregions 113c adjacent to the subregions 112c, and outermost subregions 114c are arranged such that the reflectance increases from the low-reflection region 12c toward the subregions 114c.

Consequently, the optical member 1c according to the third preferred embodiment is configured such that the reflectance increases in a stepwise manner.

To form subregions having different reflectances, the following method is preferably used. In the description below, the configuration shown in FIG. 4 in which each of the high-reflection regions 11c includes three subregions 112c, 113c, and 114c is used as an example. First, a solvent including beads is spread or dropped onto the entire surface of the base member. Then, the solvent including beads is spread or dropped onto areas in which the high-reflection regions 11c are provided. The solvent including beads is then spread or dropped onto areas in which the high-reflection regions 11c are provided but the subregions 112c adjacent to the low-reflection region 12c (i.e., the subregions 113c and 114c) are not provided. Finally, the solvent including beads is spread or dropped onto the outermost subregions 114c.

Because the amounts of spreading or dropping of the solvent including beads are different among the subregions 112c, 113c, and 114c in this method, the subregions 112c, 113c, and 114c having different reflectances can be formed in each of the high-reflection regions 11c. In addition, the reflectance of the optical member 1c according to the third preferred embodiment increases in a stepwise manner from the center portion toward the ends.

Alternatively, solvents including different amounts of beads may be spread onto the low-reflection region 12c and the subregions 112c, 113c, and 114c of the high-reflection regions 11c.

Although the configuration in which each of the high-reflection regions 11c preferably includes the three subregions 112c, 113c, and 114c is described above as an example, the number of subregions 112c, 113c, and 114c is not limited and it may be two or four or more, for example. In such a case, areas to be additionally applied with the solvent including beads and the number of spreading are changed depending on the number of subregions and positions thereof.

The above configuration achieves the same advantages and beneficial effects as those of the optical member 1b according to the second preferred embodiment.

Figure 5:
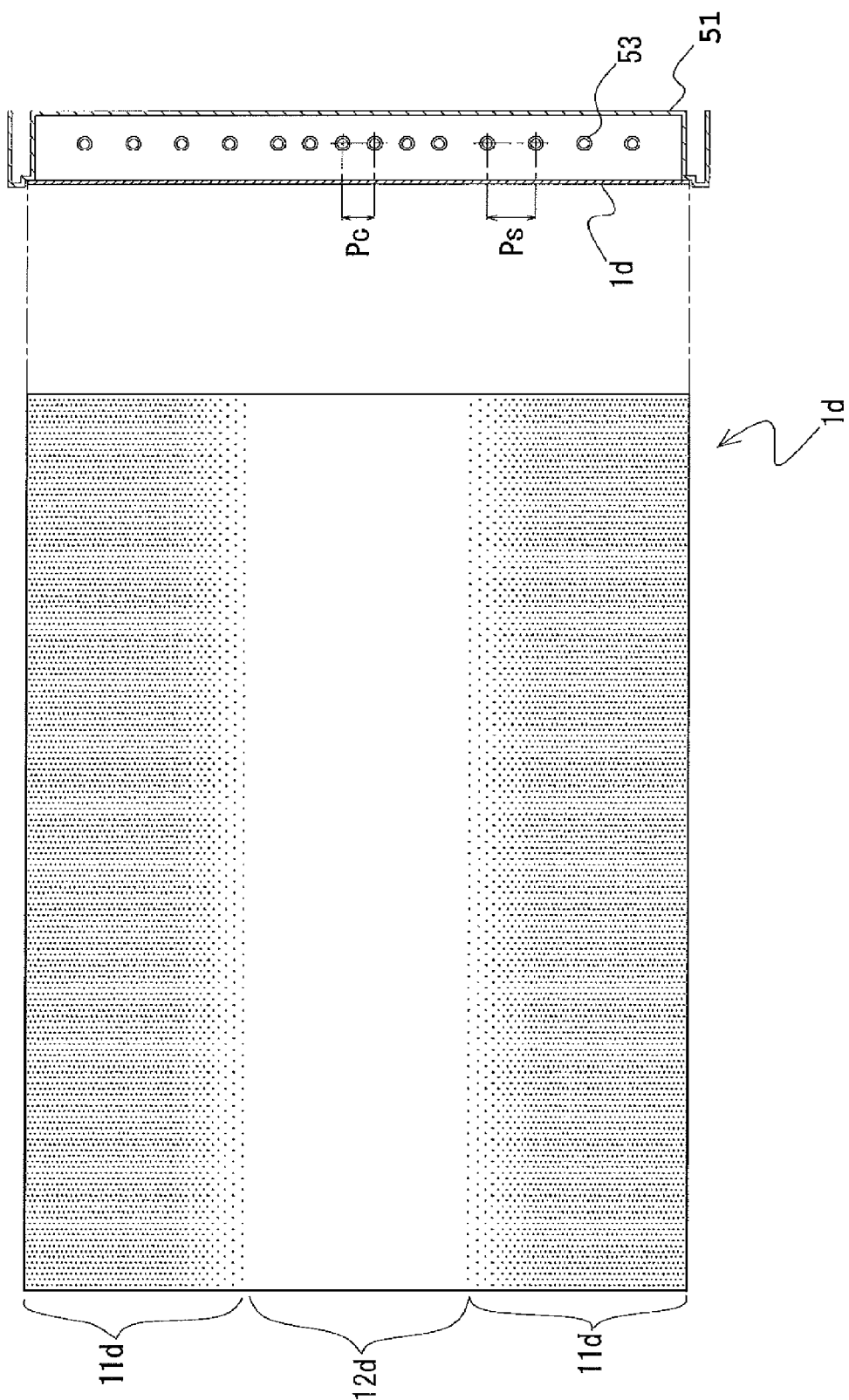
FIG. 5 shows a schematic plane view showing the configuration of an optical member 1d according to a fourth preferred embodiment of the present invention and a schematic sectional view showing the optical member 1d, the chassis 51, and the light sources 53 of the light source device 5 to which the optical member 1d is applied.

Next, a description of an optical member 1d according to a fourth preferred embodiment of the present invention is provided. FIG. 5 shows a schematic plane view showing the configuration of the optical member 1d according to the fourth preferred embodiment of the present invention and a schematic sectional view showing the optical member 1d, the chassis 51, and the light sources 53 of the light source device 5 to which the optical member 1d is applied. FIG. 5 shows the configuration of the optical member 1d according to the fourth preferred embodiment of the present invention and the relationship between the optical member 1d and the light sources 53 included in the light source device 5.

As shown in FIG. 5, the optical member 1d according to the fourth preferred embodiment is provided with high-reflection regions 11d in the areas corresponding to the areas in which the arrangement intervals between the light sources 53 are wider. In the area corresponding to the area in which the arrangement intervals between the light sources 53 are narrower, a low-reflection region 12d is provided. In other words, the low-reflection region 12d is provided in the center portion, and the high-reflection regions 11d are provided in the end portions. Each of the high-reflection regions 11d is configured such that the reflectance thereof gradually increases from the low-reflection region 12c toward the respective long side.

Figure 6:
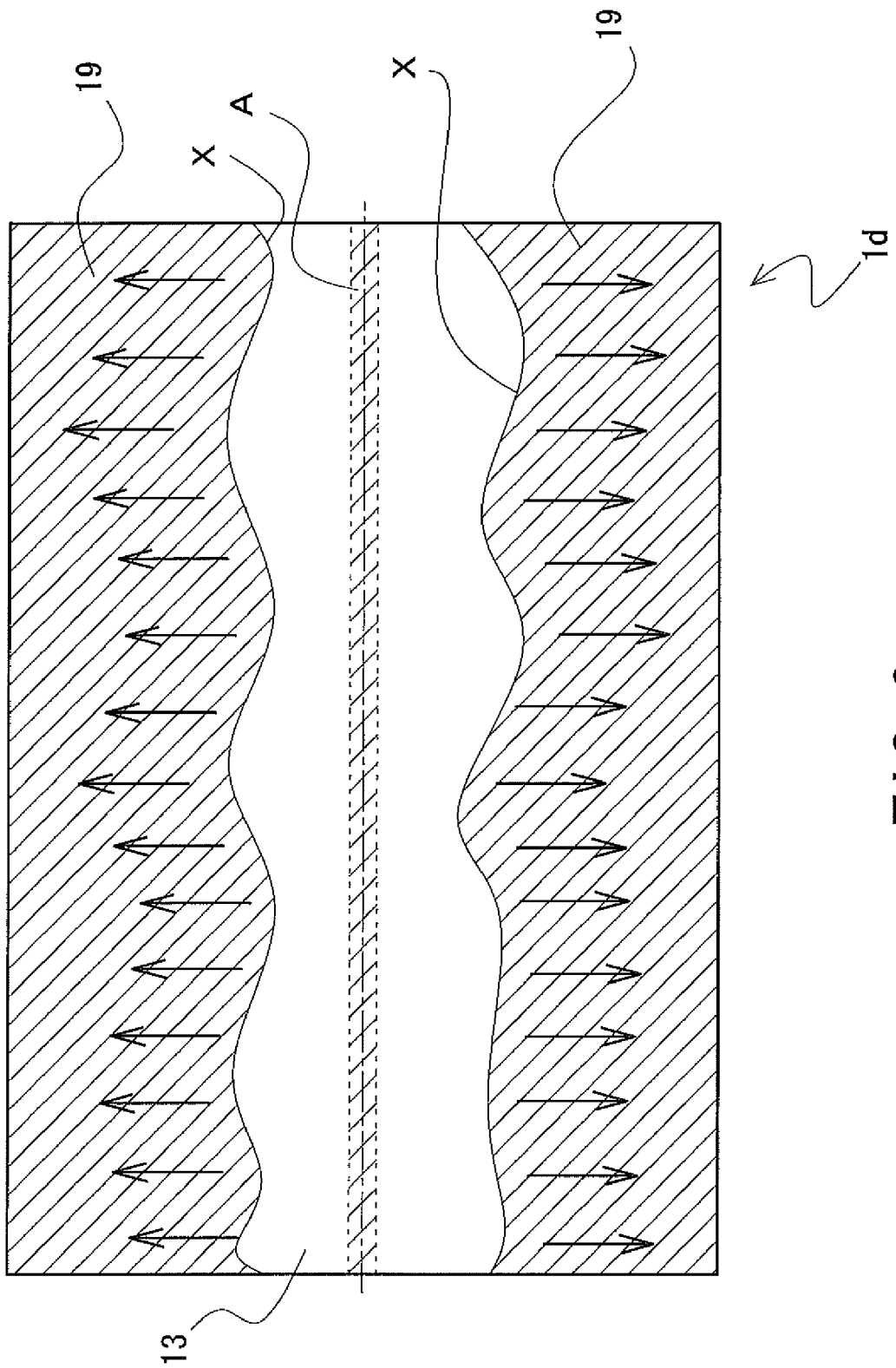
FIG. 6 is a schematic plane view showing a process for forming a low-reflection region and high-reflection regions in which light reflectance gradually varies on the optical member 1d according to the fourth preferred embodiment of the present invention.

To form the low-reflection region 12d and the high-reflection regions 11d whose light reflectance gradually varies, the following method is preferably used. FIG. 6 is a schematic plane view showing a process for forming the low-reflection region 12d and the high-reflection regions 11d whose light reflectance gradually varies.

First, a solvent including at least two kinds of beads having different sizes or a solvent including at least two kinds of beads having different masses is spread or dropped onto the entire surface of the base member. Then, as shown in FIG. 6, the center portion of the optical member 1d (the region A in the FIG. 6) is heated to gradually volatilize a spread solvent 19 from the center portion toward the end portions.

In this method, as the volatilization of the solvent 19 progresses, border lines X between the surface of the solvent 19 and the surface of a base member 13 gradually move in the directions indicated with arrows in FIG. 6, i.e., from the center portion to the ends. As a result, of the beads included in the solvent 19, beads having smaller size or mass move along with the border lines X between the surface of the solvent 19 and the surface of base member 13 and are gathered toward the ends of the base member 13.

Meanwhile, of the beads included in the solvent 19, beads having larger size or mass do not move or move only a little along with the border lines X between the surface of the solvent 19 and the surface of the base member 13. Consequently, the beads having larger size or mass do not significantly move from the positions where they are spread or dropped.

Thus, the beads having larger size or mass are substantially uniformly present over the entire surface of the base member 13 of the optical member 1d according to the fourth preferred embodiment. In contrast, the beads having smaller size or mass are barely present in the center portion, and the density thereof gradually increases toward the ends. As described above, in the center portion of the optical member 1d according to the fourth preferred embodiment, the low-reflection region 12d on which the beads having larger size or mass are spread is provided. In the end portions, the high-reflection regions 11d are provided on which the beads having larger size or mass are uniformly spread and the density of the beads having smaller size or mass gradually increases toward the ends of the base member 13.

Because a higher density of beads means a higher light reflectance, the reflectance is low in the low-reflection regions 12d. In the high-reflection regions 11d, the reflectance gradually increases toward the ends of the base member 13.

The sizes and masses of included beads are not limited to two kinds, and three or more kinds may be used. If the number of kinds of bead size or mass is increased, variance in reflectance can be made smoother.

The above configuration achieves the same advantages and beneficial effects of the optical member 1b according to the second preferred embodiment of the present invention.

Figure 7:
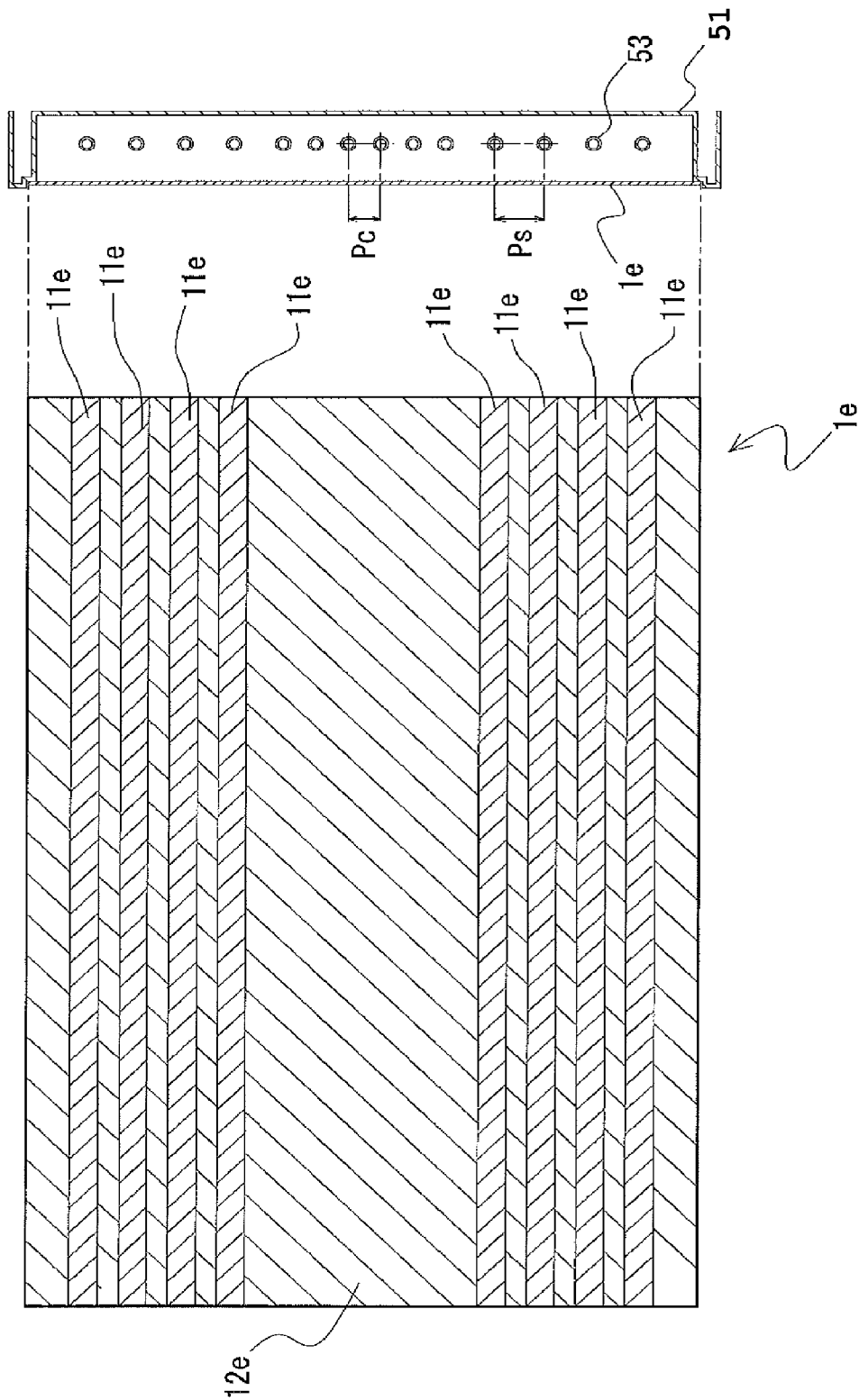
FIG. 7 shows a schematic plane view showing the configuration of an optical member 1e according to a fifth preferred embodiment of the present invention and a schematic sectional view showing the optical member 1e, the chassis 51, and the light sources 53 of the light source device 5 to which the optical member 1e is applied.

Next, a description of an optical member according to a fifth preferred embodiment of the present invention is provided. FIG. 7 shows a schematic plane view showing the configuration of an optical member 1e according to the fifth preferred embodiment of the present invention and a schematic sectional view showing the optical member 1e, the chassis 51, and the light sources 53 of the light source device 5 to which the optical member 1e is applied. FIG. 7 shows the configuration of the optical member 1e according to the fifth preferred embodiment of the present invention and the relationship between the optical member 1e and the light sources 53 included in the light source device 5.

As shown in FIG. 7, on the optical member 1e according to the fifth preferred embodiment, high-reflection regions 11e are provided in the areas corresponding to the positions of the light sources 53 which are located in the areas in which the arrangement intervals between the light sources 53 are wider. In other areas, low-reflection regions 12e are provided.

A larger arrangement interval between the light sources 53 means a greater difference between the luminance at positions where the light source 53 are present and the vicinities thereof and the luminance at the middle positions between the adjacent light sources 53. Thus, in the area in which the arrangement intervals between the light sources 53 are wider, the high-reflection regions 11e are formed in the areas corresponding to the positions of the light sources 53. Light which is emitted by the light sources 53 and enters the high-reflection regions 11e is reflected more and transmitted less than light which enters the low-reflection regions 12e. Accordingly, the luminance in the areas corresponding to the positions of the light sources 53 located in the area in which the arrangement intervals between the light source 53 are wider is made low, thereby reducing the difference to the luminance at the middle positions between the adjacent light sources 53. The above configuration thus achieves the same advantages and beneficial effects as those of the optical member 1a according to the first preferred embodiment.

To form the high-reflection regions 11e and the low-reflection regions 12e, the same method of forming the high-reflection regions 11a and the low-reflection region 12a of the optical member 1a according to the first preferred embodiment can be used, and therefore a description thereof is omitted.

It is also preferable to combine the configuration of any one of the first to fourth preferred embodiments and the configuration of the fifth preferred embodiment. Brief descriptions of optical members in which the configuration of any one of the first to fourth preferred embodiments and the configuration of the fifth preferred embodiment are combined are provided below.

Figure 8:
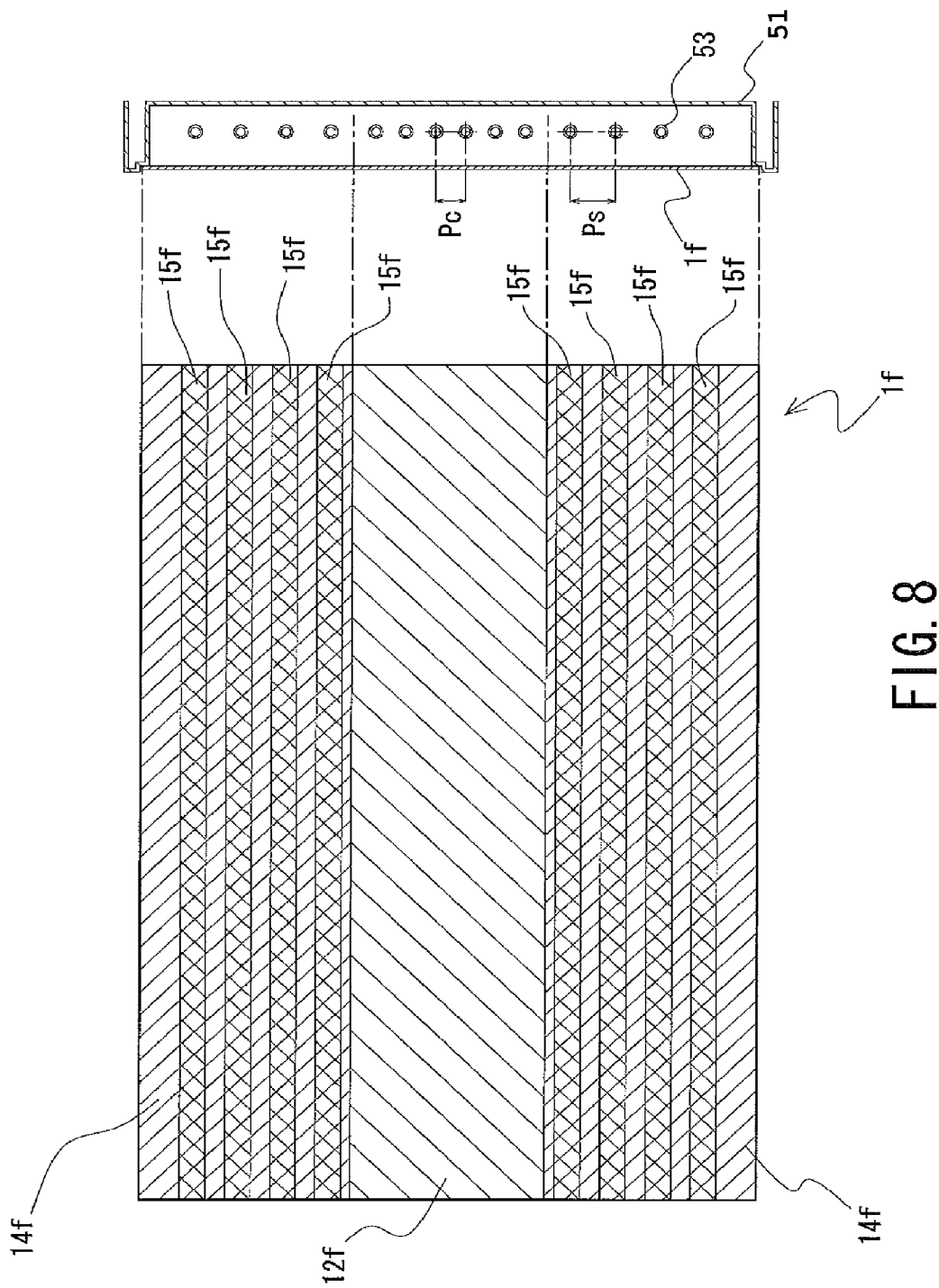
FIG. 8 shows a schematic plane view showing the configuration of an optical member 1f according to a sixth preferred embodiment of the present invention and a schematic sectional view showing the optical member 1f, the chassis 51, and the light sources 53 of the light source device 5 to which the optical member 1f is applied.

FIG. 8 shows a schematic plane view showing the configuration of an optical member 1f according to a sixth preferred embodiment of the present invention and a schematic sectional view showing the optical member 1f, the chassis 51, and the light sources 53 of the light source device 5 to which the optical member 1f is applied. FIG. 8 shows the configuration of the optical member 1f according to the sixth preferred embodiment of the present invention and the relationship between the optical member 1f and the light sources 53 included in the light source device 5.

As shown in FIG. 8, the optical member 1f according to the sixth preferred embodiment is provided with first high-reflection regions 14f and second high-reflection regions 15f in predetermined areas in the areas corresponding to the areas in which the arrangement intervals between the light sources 53 are wider. In the area corresponding to the area in which the arrangement intervals between the light sources 53 are narrower, a low-reflection region 12f is provided.

To be more specific, the first high-reflection regions 14f are provided in the entire area corresponding to the area in which the arrangement intervals between the light sources 53 are wider. The first high-reflection regions 14f can be configured in the same manner as the high-reflection regions 11a of the optical member 1a according to the first preferred embodiment. In areas corresponding to the positions of the light sources 53 located in the area in which the arrangement intervals between the light sources 53 are wider, the second high-reflection regions 15f are provided. The second high-reflection regions 15f can be configured in the same manner as the high-reflection regions 11e of the optical member 1e according to the fifth preferred embodiment.

To form the first high-reflection regions 14f, the second high-reflection regions 15f, and the low-reflection region 12f, a combination of the method of forming the high-reflection regions 11a and the low-reflection region 12a of the optical member 1a according to the first preferred embodiment and the method of forming the high-reflection regions 11e of the optical member 1e according to the fifth preferred embodiment can be used. To be more specific, the optical member 1a according to the first preferred embodiment is formed, and then the second high-reflection regions 15f are formed by additionally spreading or dropping the solvent including beads in the areas corresponding to the positions of the light sources 53 located in the area in which the arrangement intervals between the light sources 53 are wider. Alternatively, it is also preferable to form the second high-reflection regions 15f first and the first high-reflection regions 14f and the low-reflection region 12f subsequently.

The above configuration achieves the advantages and beneficial effects combining those of the optical member 1a according to the first preferred embodiment and those of the optical member 1e according to the fifth preferred embodiment.

Figure 9:
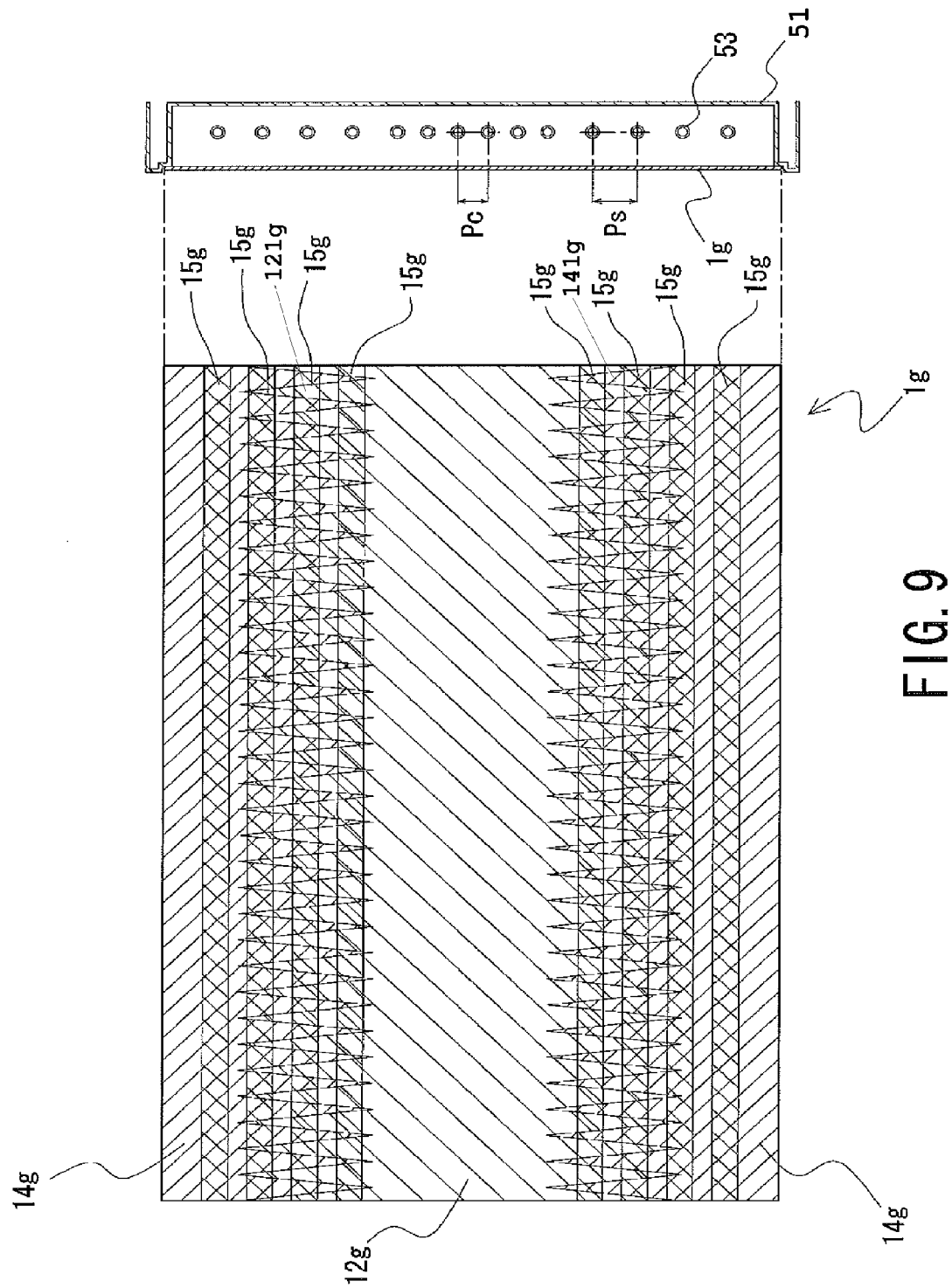
FIG. 9 shows a schematic plane view showing the configuration of an optical member 1g according to a seventh preferred embodiment of the present invention and a schematic sectional view showing the optical member 1g, the chassis 51, and the light sources 53 of the light source device 5 to which the optical member 1g is applied.

FIG. 9 shows a schematic plane view showing the configuration of an optical member 1g according to a seventh preferred embodiment of the present invention and a schematic sectional view showing the optical member 1g, the chassis 51, and the light sources 53 of the light source device 5 to which the optical member 1g is applied. FIG. 9 shows the configuration of the optical member 1g according to the seventh preferred embodiment of the present invention and the relationship between the optical member 1g and the light sources 53 included in the light source device 5.

As shown in FIG. 9, first high-reflection regions 14g are provided in areas corresponding to the areas in which the arrangement intervals between the light sources 53 are wider. The first high-reflection regions 14g can be configured in the same manner as the high-reflection regions 11b of the optical member 1b according to the second preferred embodiment. In other words, at the borders between the low-reflection region 12g and the first high-reflection regions 14g, a plurality of tapered branch portions 141g and 121g enter counterpart regions 12g and 14g, respectively. In addition, second high-reflection regions 15g are provided in areas corresponding to the positions of the light sources 53 located in the areas in which the arrangement intervals between the light sources 53 are wider. The second high-reflection regions 15g can be configured in the same manner as the high-reflection regions 11e of the optical member 1e according to the fifth preferred embodiment.

To form the first high-reflection regions 14g, the second high-reflection regions 15g, and the low-reflection region 12g, a combination of the method of forming the high-reflection regions 11b and the low-reflection region 12b of the optical member 1b according to the second preferred embodiment and the method of forming the high-reflection regions 11e of the optical member 1e according to the fifth preferred embodiment can be used. The above configuration achieves advantages and beneficial effects combining those of the optical member 1b according to the second preferred embodiment and those of the optical member 1e according to the fifth preferred embodiment.

Figure 10:
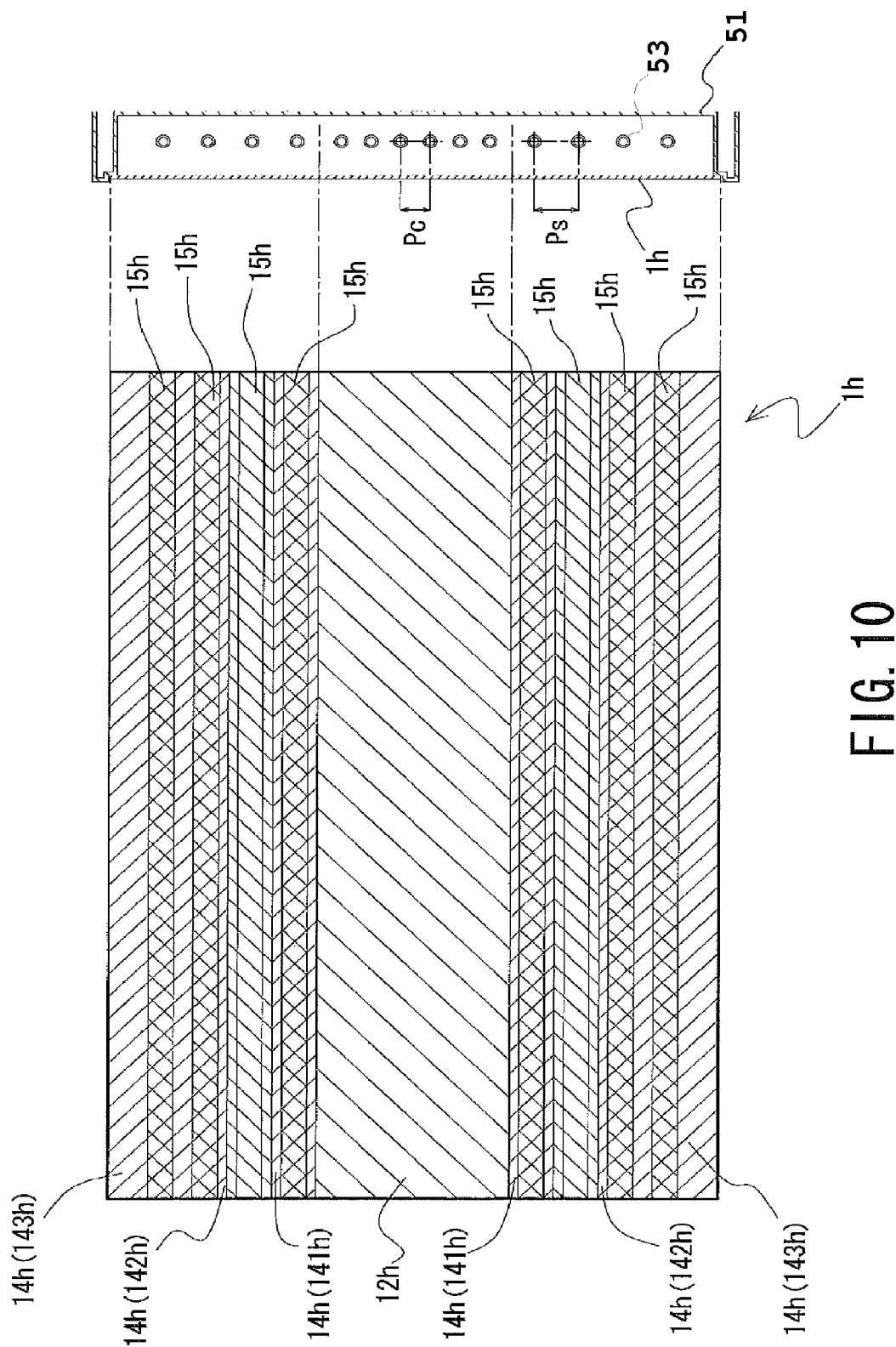
FIG. 10 shows a schematic plane view showing the configuration of an optical member 1h according to an eighth preferred embodiment of the present invention and a schematic sectional view showing the optical member 1h, the chassis 51, and the light sources 53 of the light source device 5 to which the optical member 1h is applied.

FIG. 10 shows a schematic plane view showing the configuration of an optical member 1h according to an eighth preferred embodiment of the present invention and a schematic sectional view showing the optical member 1h, the chassis 51, and the light sources 53 of the light source device 5 to which the optical member 1h is applied. FIG. 10 shows the configuration of the optical member 1h according to the eighth preferred embodiment of the present invention and the relationship between the optical member 1h and the light sources 53 included in the light source device 5.

As shown in FIG. 10, first high-reflection regions 14h are provided in areas corresponding to the areas in which the arrangement intervals between the light sources 53 are wider. The first high-reflection regions 14h can be configured in the same manner as the high-reflection regions 11c of the optical member 1c according to the third preferred embodiment. In other words, the first high-reflection regions 14 include sub-regions 141h, 142h, and 143h having different reflectances which are arranged such that the reflectance increases from the center portion toward the ends. In addition, second high-reflection regions 15h are provided in areas corresponding to the positions of the light sources 53 located in the areas in which the arrangement intervals between the light sources 53 are wider. The second high-reflection regions 15h can be configured in the same manner as the high-reflection regions 11e of the optical regions 1e according to the fifth preferred embodiment.

To form the first high-reflection regions 14h, the second high-reflection regions 15h, and the low-reflection region 12h, a combination of the method of forming the high-reflection regions 11c and the low-reflection region 12c of the optical member 1c according to the third preferred embodiment and the method of forming the high-reflection regions 11e of the optical member 1e according to the fifth preferred embodiment can be used. The above configuration achieves advantages and beneficial effects combining those of the optical member 1c according to the third preferred embodiment and those of the optical member 1e according to the fifth preferred embodiment.

Figure 11:
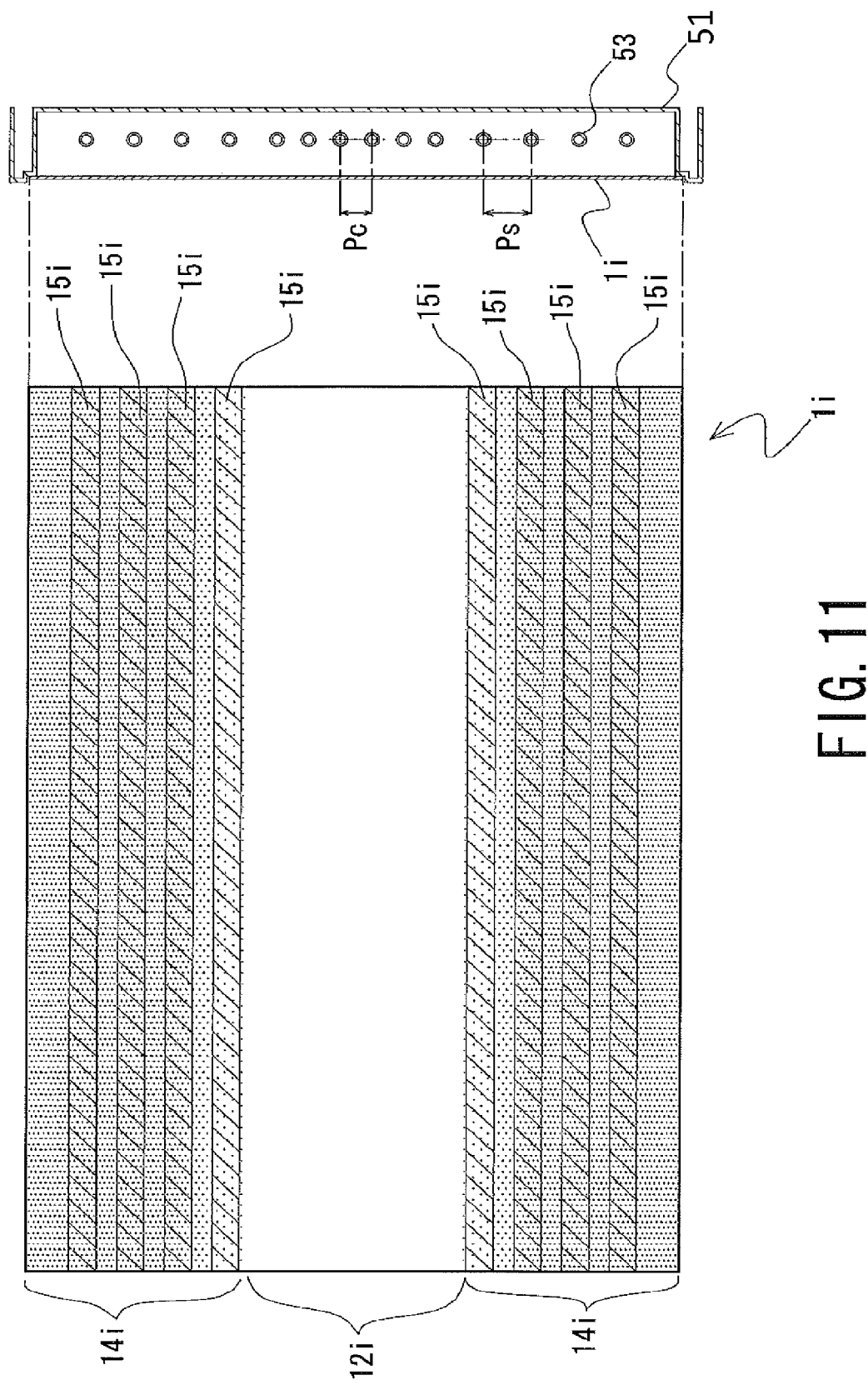
FIG. 11 shows a schematic plane view showing the configuration of an optical member 1i according to a ninth preferred embodiment of the present invention and a schematic sectional view showing the optical member 1i, the chassis 51, and the light sources 53 of the light source device 5 to which the optical member 1i is applied.

FIG. 11 shows a schematic plane view showing the configuration of an optical member 1i according to a ninth preferred embodiment of the present invention and a schematic sectional view showing the optical member 1i, the chassis 51, and the light sources 53 of the light source device 5 to which the optical member 1i is applied. FIG. 11 shows the configuration of the optical member 1i according to the ninth preferred embodiment of the present invention and the relationship between the optical member 1i and the light sources 53 included in the light source device 5.

As shown in FIG. 11, first high-reflection regions 14i are provided in areas corresponding to the areas in which the arrangement intervals between the light sources 53 are wider. The first high-reflection regions 14i can be configured in the same manner as the high-reflection regions 11d of the optical member 1d according to the fourth preferred embodiment. In other words, each of the first high-reflection regions 14i is configured such that the reflectance thereof gradually increases from a low reflection region 12i toward the respective long side. In addition, second high-reflection regions 15i are provided in areas corresponding to the positions of the light sources 53 located in the areas in which the arrangement intervals between the light sources 53 are wider. The second high-reflection regions 15i can be configured in the same manner as the high-reflection regions 11e of the optical regions 1e according to the fifth preferred embodiment.

To form the first high-reflection regions 14i, the second high-reflection regions 15i, and the low-reflection region 12i, a combination of the method of forming the high-reflection regions 11d and the low-reflection region 12d of the optical member 1d according to the fourth preferred embodiment and the method of forming the high-reflection regions 11e of the optical member 1e according to the fifth preferred embodiment can be used. The above configuration achieves advantages and beneficial effects combining those of the optical member 1d according to the fourth preferred embodiment and those of the optical member 1e according to the fifth preferred embodiment.

Figure 12:
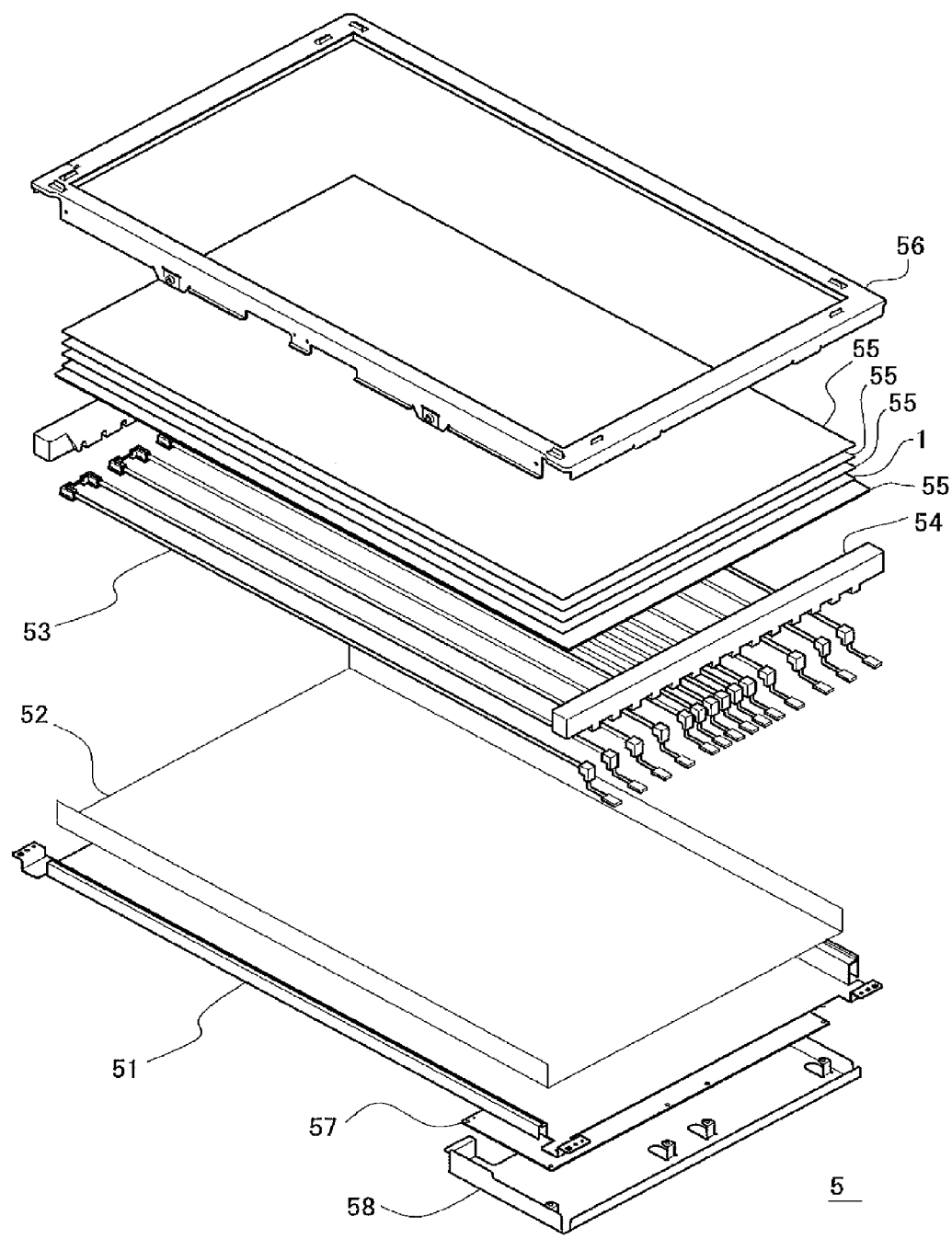
FIG. 12 is an exploded perspective view schematically showing the structure of relevant components of a light source device according to a preferred embodiment of the present invention.

Next, a description of a light source device according to a present preferred embodiment of the present invention is provided. The light source device 5 according to the present preferred embodiment includes the optical member 1a-1i according to any one of the preferred embodiments described above (hereinafter the numeral "1" is used). FIG. 12 is an exploded perspective view schematically showing the structure of relevant components of the light source device 5 according to the present preferred embodiment of the present invention. For the sake of convenience in explanation, the upper side of the FIG. 12 is referred to as "the front side" of the light source device 5 and members included in the light source device 5, and the bottom side is referred to as "the back side".

FIG. 12 shows that the light source member 5 according to the present preferred embodiment of the present invention preferably includes the chassis 51, a reflection sheet 52, the light sources 53, side holders 54, an optical member 1 according to any one of the preferred embodiments of the present invention, other optical members 55, a frame 56, a light-source driving circuit board 57, and a light-source driving circuit board cover 58.

As the chassis 51, the reflection sheet 52, the light sources 53, the side holders 54, the other optical members 55, the frame 56, the light-source driving circuit board 57, and the light-source driving circuit board cover 58, conventional ones can be used. Thus, only brief descriptions thereof are provided and details are omitted.

The chassis 51 is a member having a substantially flat shape or a shallow tray-like shape, and formed preferably by applying press working on a metal plate. At both long sides of the chassis 51, side walls standing toward the front side are formed, and step-like surfaces are provided on the tops of the side walls (i.e., on the front side) so that the optical member 1 according to any one of the preferred embodiments described above and the other optical members 55 (to be described) are placed.

As the light source 53, various known linear light sources can be used such as a fluorescent tube including a cold cathode tube and a hot cathode tube and a discharge tube including a xenon tube. In FIG. 12, a liner cold cathode tube is preferably used.

The reflection sheet 52 preferably is a plate-shaped or sheet-shaped member having surface texture which diffusely reflects light emitted by the light sources 53. The reflection sheet 52 is preferably made of an expanded PET (polyethylene terephthalate), for example.

The side holders 54 function for example as spacers used to position the optical member 1 and the other optical members 55. The two side holders 54 are in pair and have substantially identical size and shape. The side holders 54 preferably have a substantially bar shape and preferably are unitary molded resin members.

The other optical members 55 are sheet-shaped or plate-shaped members which adjust characteristics of light emitted by the light sources 53. The other optical members 55 generally include a diffusing plate which diffuses light emitted by the light sources 53 and holds sheet-shaped optical members, a diffusing sheet which diffuses light emitted by the light sources 53, a lens sheet capable of collecting light, a polarizing reflection sheet which transmits light polarized in a given direction and reflects light polarized in the other directions. The other optical members 55 to be used are selected according to factors such as the type of the light source device and are stacked in a given order.

As for the light source device 5 according to the present preferred embodiment, the other optical members 55 include one diffusing plate, two diffusing sheets, and one lens sheet.

The frame 56 holds and/or protects the optical member 1, the other optical members 55, a display panel (not shown), and other constituent elements. The frame 56 preferably is shaped like a picture frame substantially in the shape of a square with an opening. The frame 56 may be unitary molded using preferably a resin material, be formed by combining a plurality of components molded using preferably a resin material, be unitary formed from a metal plate by press working, or be formed by combining components formed from a metal plate by press working.

The light-source driving circuit board 57 is a circuit board on which an electronic circuit and an electric circuit which drive the light sources 53 and other constituent elements are provided. If cold cathode tubes are used as the light sources 53, an inverter circuit for generating a high pulse voltage is preferably provided. The light-source driving circuit board cover 58 is a plate-shaped member which covers the light-source driving circuit board 57 and is made of a conductor such as a metal plate.

The light source device 5 according to the present preferred embodiment is assembled as follows.

The reflection sheet 52 is placed on the front side of the chassis 51. The light sources 53 are placed on the front side of the reflection sheet 52. As described above, the light sources 53 are arranged substantially in parallel to one another at narrower intervals in the center portion and at wider intervals in the end portions.

On the front side of the short sides of the chassis 51, the side holders 54 are provided to cover the ends of the light sources 53. On the front side of the side walls of the chassis 51 and the side holders 54, the optical member 1 according to any one of the preferred embodiments described above and the other optical members 55 are provided in a predetermined order.

For example, the diffusing plate, the optical member 1, the first diffusing sheet, the lens sheet, and the second diffusing sheet are stacked in this order from the back side (i.e., from the side of the light sources 53).

The relationship among the low-reflection region and the high-reflection regions (including the first high-reflection regions and the second high-reflection regions) provided on the optical member 1 and the light sources is as described above, and action and effect according to the optical member 1 used can be obtained. Accordingly, a description thereof is omitted (see FIGS. 1, 3-5, and 7-11 and the descriptions thereof).

The light-source driving circuit board 57 is placed on the back side of the chassis 51, and a harness drawn from each of the light sources 53 is connected to the light-source driving circuit board 57. In addition, the light-source driving circuit board cover 58 is attached to cover the light-source driving circuit board 57.

In the above light source device 5, light emitted by the light sources 53 enters the diffusing plate directly or after being reflected by the reflection sheet 52. The light entering the diffusing plate passes through the diffusing plate while being randomly diffused. Accordingly, variance in luminance can be reduced.

The light having passed through the diffusing plate enters the optical member 1 described above. Because the low-reflection region is provided in the area corresponding to the area in which the arrangement intervals between the light sources 53 are narrower, the luminance is prevented from decreasing in this area. Meanwhile, the high-reflection regions are provided in the areas corresponding to the areas in which the arrangement intervals between the light sources 53 are wider or the areas corresponding to the positions of the light sources 53 located in the areas in which the arrangement intervals between the light source 53 are wider, such that the amount of reflected light is large while the amount of transmitting light is small. In addition, the reflected light reenters the diffusing plate and is diffused. Accordingly, difference in luminance can be reduced.

The light having passed through the optical member 1 passes through the first diffusing sheet, the lens sheet, and the second diffusing sheet and is emitted to the outside.

By configuring the optical member 1 in such a way that the entire surface thereof reflects light diffusely, it is possible to make the optical member 1 function as a diffusing plate or a diffusing sheet. According, the optical member configured as such allows the diffusing plate to be omitted. In the configuration in which the diffusing plate is omitted, if it is necessary to hold the optical member 1 and the other optical member 55, a substantially transparent plate-shaped member is provided to hold them. In other words, the diffusing plate may be replaced by the substantially transparent plate-shaped member.

Alternatively, the optical member 1 may be formed using a base material having the same hardness as that of the diffusing plate to hold the other optical members 55. This allows the diffusing plate or the substantially transparent plate-shaped member described above to be omitted.

Next, a description of a display device according to a present preferred embodiment of the present invention is provided. A display device 6 according to the present preferred embodiment includes the light source device 5 according to the preferred embodiment described above.

Figure 13:
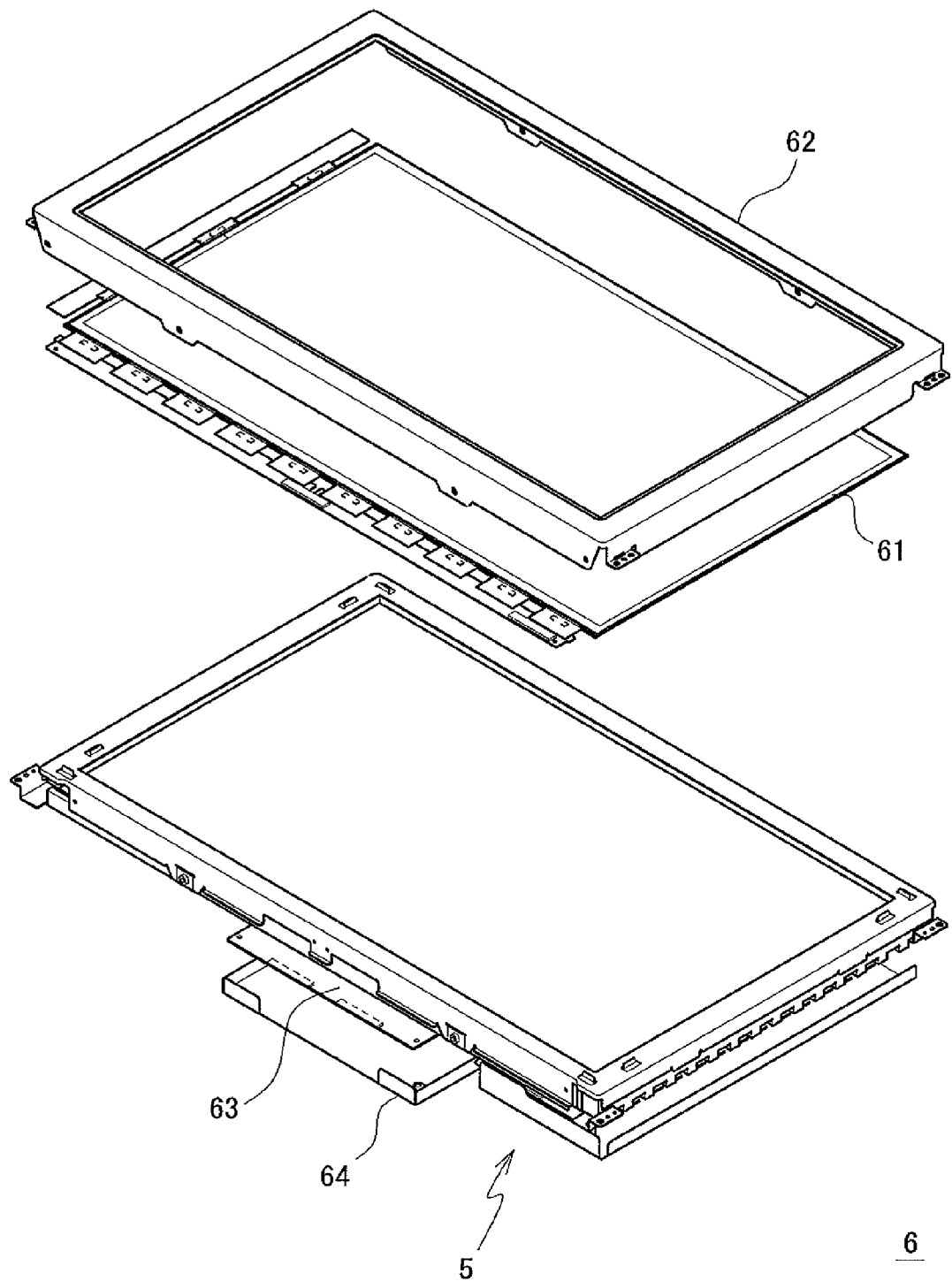
FIG. 13 is an exploded perspective view schematically showing the structure of relevant components of a display device according to a preferred embodiment of the present invention.

FIG. 13 is an exploded perspective view schematically showing the structure of relevant components of the display device 6 according to the present preferred embodiment of the present invention. The display device 6 includes the light source device 5 according to the preferred embodiment described above, a display panel 61, a bezel 62, a control circuit board 63, and a control circuit board cover 64. As the display panel 61, the bezel 62, the control circuit board 63, and the control circuit board cover 64, known ones can be used. Thus, only brief descriptions thereof are provided and details are omitted.

As the display panel 61, various known transparent display panels may be used such as a transparent active-matrix liquid crystal display panel. An active-matrix liquid crystal display panel, for example, is provided with an active region in which images can be displayed. In other words, this active region functions as the "screen of display panel".

The bezel 62 holds and/or protects the display panel 61. As shown in FIG. 13, the bezel 62 preferably is shaped like a picture frame substantially in the shape of a square with an opening. The bezel 62 may be unitarily formed from a metal plate by press working, formed by combining components formed from preferably a metal plate by press working, unitarily molded using preferably a resin material, or formed by combining a plurality of components molded using preferably a resin material.

The control circuit board 63 is a circuit board on which an electronic circuit and/or an electric circuit which generates signals for controlling the display panel 61 is provided. The control circuit board 63 generates signals based on image signals inputted from the outside. The control circuit board cover 64 is a plate-shaped member which covers the control circuit board 63 and is made of a conductor such as a metal plate.

The display device 6 including the components described above is assembled as follows.

The display panel 61 is placed on the front side of the frame 56 of the light source device 5 according to the preferred embodiment described above, and the bezel 62 is attached on the frame 56 from the front side. Accordingly, the display panel 61 is held and protected by the frame 56 and the bezel 62.

The control circuit board 63 is placed on the back side of the chassis 51 of the light source device 5 and is connected to a printed circuit board which is to be attached to the display panel 61. In addition, the control circuit board cover 64 is attached to cover the control circuit board 63.

The display device 6 according to the present preferred embodiment is obtained as described above. The display device 6 avoids significant variance in luminance on the display panel screen and is thus capable of displaying images with high quality.

Figure 14:
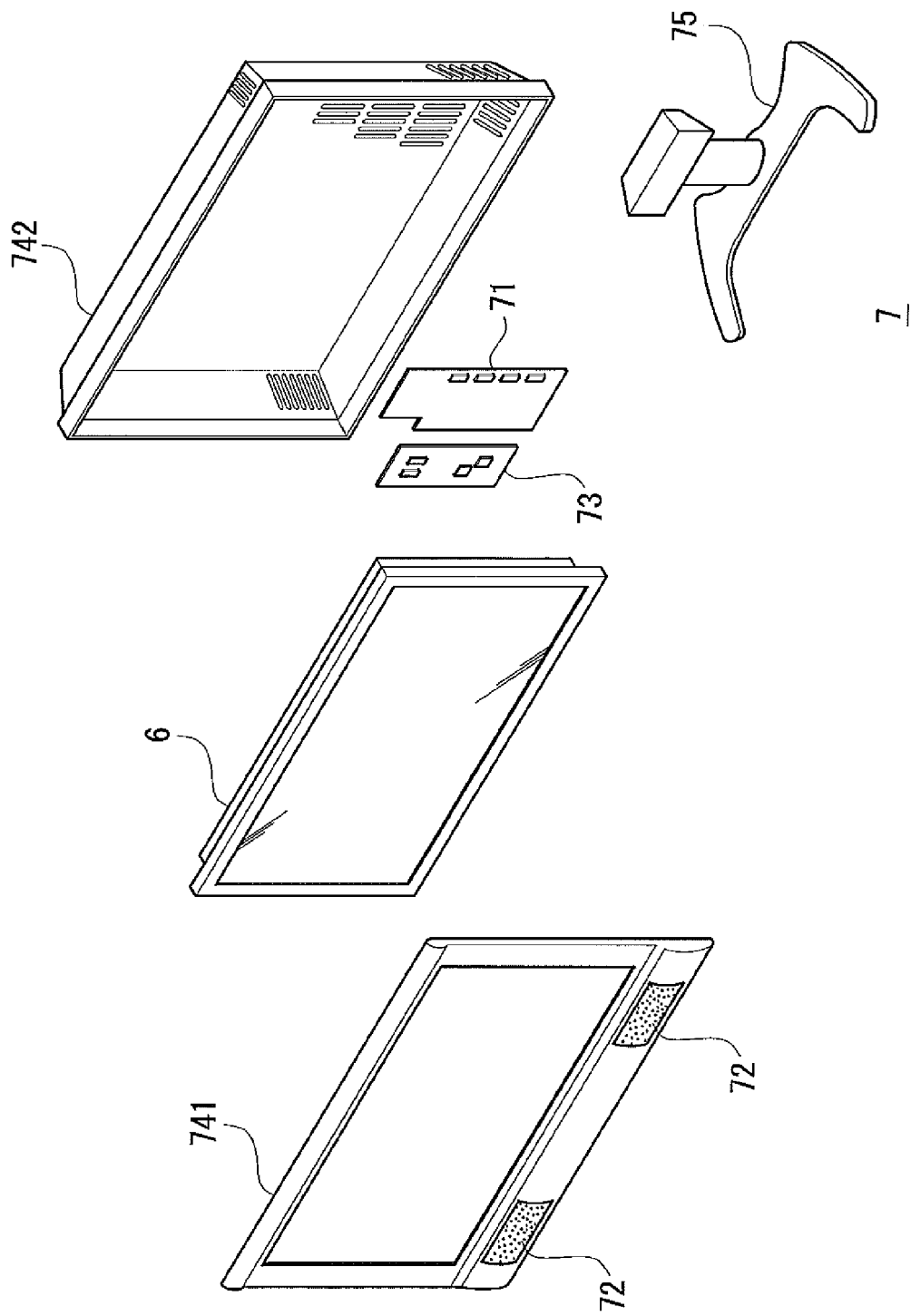
FIG. 14 is an exploded perspective view schematically showing the structure of relevant components of a television receiver including the display device according to a preferred embodiment of the present invention.
Figure 15:
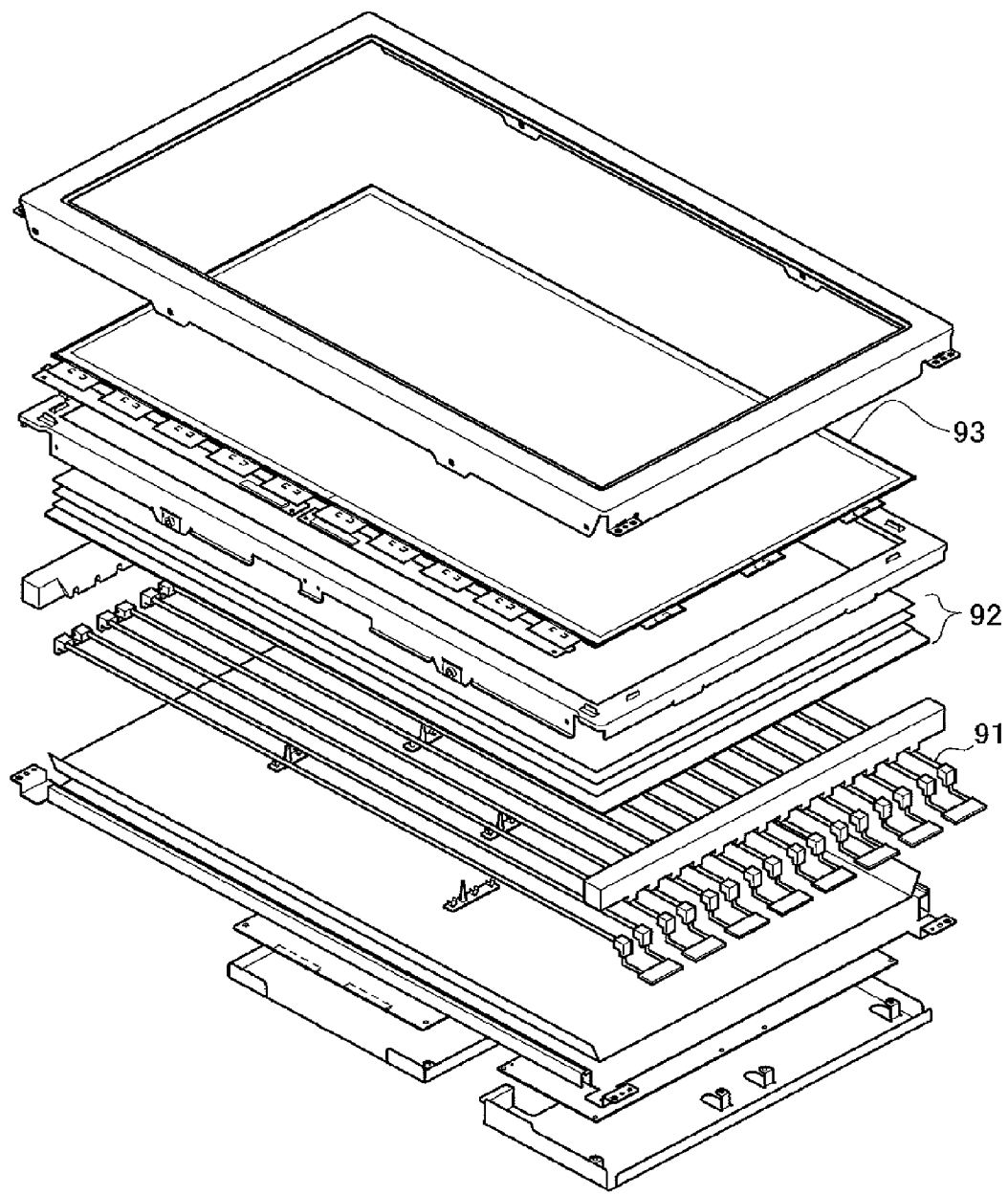
FIG. 15 is an exploded perspective view schematically showing the structure of relevant components of a conventional display device including a transparent display panel and light sources.

Next, a description of a television receiver including the display device 6 according to the preferred embodiment is provided. FIG. 14 is an exploded perspective view schematically showing the structure of relevant components of a television receiver 7 including the display device 6 according to the preferred embodiment described above.

As shown in FIG. 14, the television receiver 7 includes the display device 6 according to the preferred embodiment described above, a tuner 71, a power supply board 73, a loudspeaker mechanism 72, a cabinet 741, 742, and a supporting member 75. As the tuner 71, the power supply board 73, the loudspeaker mechanism 72, the cabinet 741, 742, and the supporting member 75, conventional ones can be used. Thus, only brief descriptions thereof are provided and details are omitted.

The tuner 71 generates image signals and sound signals of a given channel based on received airwaves and image signals inputted from the outside. As the tuner 71, a conventional tuner such as a terrestrial tuner (an analog terrestrial tuner, a digital terrestrial tuner, or an analog/digital terrestrial tuner), a BS tuner, and a CS tuner can be used. The loudspeaker 72 generates sound based on sound signals generated by the tuner 71. As the loudspeaker 72, a general loudspeaker can be used. The power supply board 73 is capable of supplying power to the display device 6, the tuner 71, the loudspeaker mechanism 72, and other components.

The display device 6, the tuner 71, the loudspeaker mechanism 72, and the power supply board 73 are housed in the cabinet 741, 742 and supported by the supporting member 75. FIG. 14 shows a configuration in which the cabinet 741, 742 includes a front side cabinet 741 and a back side cabinet 742, and the display device 6, the tuner 71, the loudspeaker mechanism 72, and the power supply board 73 are housed between the cabinets 741 and 742. Alternatively, the tuner 71, the loudspeaker mechanism 72, and the power supply board 73 may be attached to the display device 6.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An optical member to be placed between a display panel which displays an image on a screen and a light source which illuminates the display panel, the optical member comprising a plurality of regions which are arranged mutually adjacent in one direction on the optical member and have different light reflectances; wherein
the plurality of regions have constant light reflectances in a direction perpendicular to the one direction of the arrangement of the plurality of regions extending along an entire length of the optical member and a region of the plurality of regions which is provided in an area corresponding to an end portion of the screen of the display panel has a higher light reflectance than a light reflectance in another region of the plurality of regions which is provided in an area corresponding to a center portion of the screen of the display panel.

2. The optical member according to claim 1, wherein the region having higher light reflectance increases in area from a side corresponding to a center side of the screen of the display panel toward a side corresponding to an end portion side of the screen of the display panel.

3. The optical member according to claim 1, wherein light reflectance in the region having higher light reflectance increases in a stepwise manner from a side corresponding to a center side of the screen of the display panel toward a side corresponding to an end side of the screen of the display panel.

4. The optical member according to claim 1, wherein light reflectance in the region having higher light reflectance increases gradually from a side corresponding to a center side of the screen of the display panel toward a side corresponding to an end side of the screen of the display panel.

5. The optical member according to claim 1, further comprising a region having higher light reflectance which is provided in an area corresponding to a position of the light source located in the end portion of the screen of the display panel.

6. A light source device for illuminating a display panel which displays an image on a screen, the light source device comprising:
a plurality of linear light sources arranged such that intervals between the adjacent light sources in an area corresponding to an end portion of the screen of the display panel are wider than intervals between the adjacent light sources in an area corresponding to a center portion of the screen of the display panel; and
an optical member which is placed on a front side of the plurality of light sources and includes a region which is provided in an area corresponding to the area in which the intervals between the adjacent light sources are wider and has higher light reflectance than light reflectance in a region which is provided in other area.

7. The light source device according to claim 6, wherein the region which is provided on the optical member and has higher light reflectance increases in area from a side corresponding to a center side of the screen of the display panel toward a side corresponding to an end portion side of the screen of the display panel.

8. The light source device according to claim 6, wherein light reflectance in the region which is provided on the optical member and has higher light reflectance increases in a stepwise manner from a side corresponding to a center side of the screen of the display panel toward a side corresponding to an end side of the screen of the display panel.

9. The light source device according to claim 6, wherein light reflectance in the region which is provided on the optical member and has higher light reflectance increases gradually from a side corresponding to a center side of the screen of the display panel toward a side corresponding to an end side of the screen of the display panel.

10. The light source device according to claim 6, wherein the optical member further comprises regions which are provided in areas corresponding to positions of the light sources located in the end portion of the screen of the display panel and have higher light reflectance than the light reflectance in the region which is provided in the area corresponding to the center portion of the screen of the display panel.

11. A light source device for illuminating a display panel which displays an image on a screen, the light source device comprising:
a plurality of linear light sources arranged such that intervals between the adjacent light sources in a given area on the screen of the display panel are wider than intervals between the adjacent light sources in an area other than a portion in which luminance is the highest on the screen of the display panel, and
an optical member which is placed on a front side of the plurality of light sources and includes a region which is provided in an area corresponding to the area in which the intervals between the adjacent light sources are wider and has higher light reflectance than light reflectance in the portion in which the luminance is the highest on the screen of the display panel.

12. The light source device according to claim 11, wherein the region having higher light reflectance of the optical member increases in area from a side corresponding to the portion in which the luminance is the highest on the screen of the display panel toward a side corresponding to a portion in which luminance is the lowest on the screen of the display panel.

13. The light source device according to claim 11, wherein light reflectance in the region having higher light reflectance of the optical member increases in a stepwise manner from a side corresponding to the portion in which the luminance is the highest on the screen of the display panel toward a side corresponding to a portion in which luminance is the lowest on the screen of the display panel.

14. The light source device according to claim 11, wherein light reflectance in the region having higher light reflectance of the optical member increases gradually from a side corresponding to the portion in which the luminance is the highest on the screen of the display panel toward a side corresponding to a portion in which luminance is the lowest on the screen of the display panel.

15. The light source device according to claim 11, wherein the optical member further comprises regions which are provided in areas corresponding to positions of the light sources located in an area in which the luminance is lower than the luminance in the portion in which the luminance is the highest on the screen of the display panel and have higher light reflectance than the light reflectance in the portion in which the luminance is the highest on the screen of the display panel.

16. A light source device for illuminating a display panel which displays an image on a screen, the light source device comprising:

a plurality of linear light sources arranged such that intervals between the adjacent light sources in a given area on the screen of the display panel are wider than intervals between the adjacent light sources in an area corresponding to a portion in which luminance is the highest on the screen of the display panel; and an optical member which is placed on a front side of the plurality of light sources and includes regions which are provided in areas corresponding to positions of the light sources located in the area in which the intervals between the adjacent light sources are wider and have higher light reflectance than light reflectance in a region which is provided in an area corresponding to a center portion of the screen of the display panel.

* * * * *